US011867573B2

(12) United States Patent
Takahata

(10) Patent No.: US 11,867,573 B2
(45) Date of Patent: Jan. 9, 2024

(54) TEMPERATURE DETECTION DEVICE, DISPLAY DEVICE, AND HEAD UP DISPLAY

(71) Applicant: Japan Display Inc., Tokyo (JP)

(72) Inventor: Masashi Takahata, Tokyo (JP)

(73) Assignee: Japan Display Inc., Tokyo (JP)

( * ) Notice: Subject to any disclaimer, the term of this patent is extended or adjusted under 35 U.S.C. 154(b) by 225 days.

(21) Appl. No.: 17/485,654

(22) Filed: Sep. 27, 2021

(65) Prior Publication Data

US 2022/0102963 A1 Mar. 31, 2022

(30) Foreign Application Priority Data

Sep. 29, 2020 (JP) ................................. 2020-164176

(51) Int. Cl.
| | |
|---|---|
| *G01K 7/16* | (2006.01) |
| *G01K 1/02* | (2021.01) |
| *H02H 6/00* | (2006.01) |
| *H02H 1/00* | (2006.01) |

(52) U.S. Cl.
CPC .............. *G01K 7/16* (2013.01); *G01K 1/026* (2013.01); *H02H 1/0007* (2013.01); *H02H 6/00* (2013.01); *G09G 2320/00* (2013.01); *G09G 2320/041* (2013.01)

(58) Field of Classification Search
CPC ........ G01K 7/16; G01K 1/026; H02H 1/0007; H02H 6/00; G09G 2320/00; G09G 2320/041
See application file for complete search history.

(56) References Cited

U.S. PATENT DOCUMENTS

| | | | | | |
|---|---|---|---|---|---|
| 3,109,137 | A | * | 10/1963 | Huddleston, Jr. ........ | G01K 7/25 323/275 |
| 4,216,675 | A | * | 8/1980 | Nagata ..................... | G01K 7/20 374/173 |
| 4,516,865 | A | * | 5/1985 | Hideo ...................... | G01K 7/21 374/185 |
| 8,610,646 | B2 | * | 12/2013 | Kohno ................. | G09G 3/3233 345/76 |
| 2008/0246702 | A1 | * | 10/2008 | Lee ...................... | G09G 3/3233 345/77 |

(Continued)

FOREIGN PATENT DOCUMENTS

JP 2015200720 A 11/2015

*Primary Examiner* — Nathaniel T Woodward
*Assistant Examiner* — Philip L Cotey
(74) *Attorney, Agent, or Firm* — K&L Gates LLP

(57) ABSTRACT

A temperature detection device includes: a detection part in which a first resistor element and a second resistor element having different relations between temperature variation and variation in an electric resistance value are provided; a switch provided capable of performing a switching operation so as to be coupled to one of a first circuit including wiring to which the first resistor element is coupled and a second circuit including wiring to which the second resistor element is coupled; a power supply circuit configured to apply a voltage to the one circuit coupled to the power supply circuit through the switch to generate an electric signal in the one circuit; and a controller configured to detect a temperature of the detection part based on a strength of the electric signal output from the one circuit. The controller is configured to periodically cause the switch to perform the switching operation.

17 Claims, 16 Drawing Sheets

(56) References Cited

U.S. PATENT DOCUMENTS

| | | | |
|---|---|---|---|
| 2009/0184984 A1* | 7/2009 | Takahara | G09G 3/325 |
| | | | 382/168 |
| 2013/0127980 A1* | 5/2013 | Haddick | G06F 3/013 |
| | | | 348/14.08 |
| 2013/0293241 A1* | 11/2013 | Mayer | G01K 7/16 |
| | | | 324/510 |
| 2015/0287371 A1* | 10/2015 | Uehara | G09G 3/3611 |
| | | | 345/87 |
| 2016/0123817 A1* | 5/2016 | Bennett | H01L 27/1225 |
| | | | 374/185 |
| 2021/0323301 A1* | 10/2021 | Cicili | B41J 2/04563 |
| 2021/0347106 A1* | 11/2021 | Morris | G01K 1/026 |

\* cited by examiner

FIG.14

| | VARIATION IN OUTPUT VOLTAGE RELATIVE TO VARIATION OF 1°C [mV/°C] | |
|---|---|---|
| TEMPERA-TURE RANGE | 0°C TO 50°C | 50°C TO 100°C |
| FIRST RESISTOR ELEMENT | 10 | 2 |
| SECOND RESISTOR ELEMENT | 2 | 10 |

FIG.15

| | OUTPUT VALUE (DIGITAL) | |
|---|---|---|
| TEMPERA-TURE | 25°C | 75°C |
| FIRST RESISTOR ELEMENT | 512 | 572 |
| SECOND RESISTOR ELEMENT | 452 | 512 |

FIG.17
|  | OUTPUT VALUE (DIGITAL) | | |
|---|---|---|---|
| TEMPERA-TURE | 49°C | 50°C | 51°C |
| FIRST RESISTOR ELEMENT | 560 | 562 | 562 |
| SECOND RESISTOR ELEMENT | 462 | 462 | 464 |
FIG.18
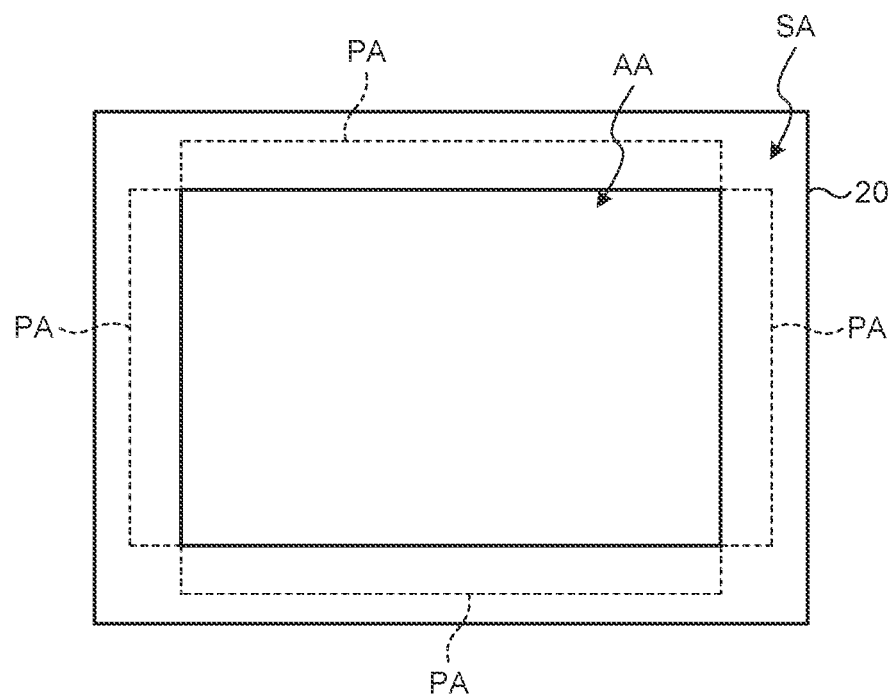
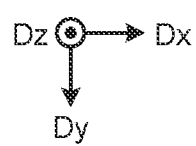

FIG.21
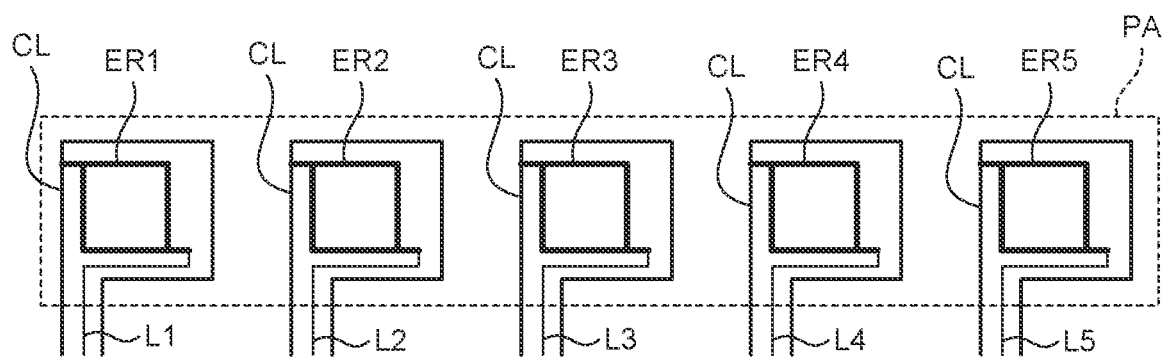
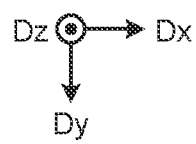
FIG.22
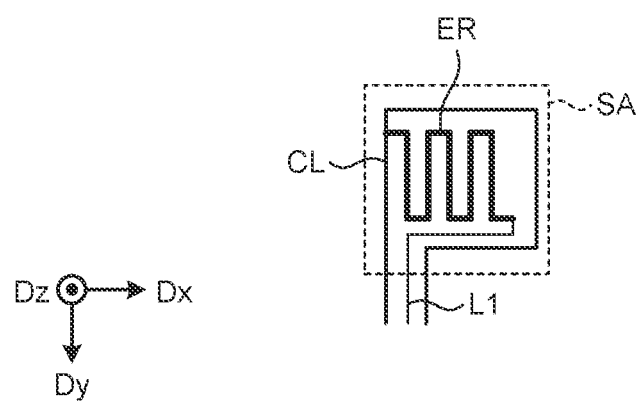

TEMPERATURE DETECTION DEVICE, DISPLAY DEVICE, AND HEAD UP DISPLAY

CROSS-REFERENCE TO RELATED APPLICATION

This application claims the benefit of priority from Japanese Patent Application No. 2020-164176 filed on Sep. 29, 2020, the entire contents of which are incorporated herein by reference.

BACKGROUND

1. Technical Field

What is disclosed herein relates to a temperature detection device, a display device, and a head up display.

2. Description of the Related Art

As disclosed in Japanese Patent Application Laid-open Publication No. 2015-200720 (JP-A-2015-200720), a temperature information acquisition method for determining a temperature based on variation in an electric resistance value of an electrode provided as a temperature detection element has been known.

With a relation between temperature variation indicated by an electrode of a single type and variation in an electric resistance value, the variation in the electric resistance value relative to the temperature variation may not be large enough to strictly determine a temperature when the temperature is within a certain temperature range. It is therefore difficult to employ the method disclosed in JP-A-2015-200720 when it is desired to detect a temperature in a wider temperature range with high accuracy.

For the foregoing reasons, there is a need for a temperature detection device, a display device, and a head-up display capable of detecting a temperature in a wider temperature range with high accuracy.

SUMMARY

According to an aspect, a temperature detection device includes: a detection part in which a first resistor element and a second resistor element having different relations between temperature variation and variation in an electric resistance value are provided; a switch provided capable of performing a switching operation so as to be coupled to one of a first circuit including wiring to which the first resistor element is coupled and a second circuit including wiring to which the second resistor element is coupled; a power supply circuit configured to apply a voltage to the one circuit coupled to the power supply circuit through the switch to generate an electric signal in the one circuit; and a controller configured to detect a temperature of the detection part based on a strength of the electric signal output from the one circuit. The controller is configured to periodically cause the switch to perform the switching operation.

According to an aspect, a display device includes: a display panel configured to display an image; and the temperature detection device. The temperature detection device is arranged so as to overlap with the display panel.

According to an aspect, a head up display includes: a display panel configured to display an image; and temperature detection device arranged so as to overlap with a display surface of the display panel. The temperature detection device includes: a detection part in which a first resistor element and a second resistor element having different relations between temperature variation and variation in an electric resistance value are provided; a switch provided capable of performing a switching operation so as to be coupled to one of a first circuit including wiring to which the first resistor element is coupled and a second circuit including wiring to which the second resistor element is coupled; a power supply circuit configured to apply a voltage to the one circuit coupled to the power supply circuit through the switch to generate an electric signal in the one circuit; and a controller configured to detect a temperature of the detection part based on a strength of the electric signal output from the one circuit. The controller is configured to periodically cause the switch to perform the switching operation.

BRIEF DESCRIPTION OF THE DRAWINGS

FIG. 10 is a graph illustrating relations between temperatures and volume resistivities of metals differing from one another and a relation between a temperature and a volume resistivity of a certain alloy or the like;

FIG. 14 is a table individually illustrating variation in an output voltage per 1° C. variation in temperature when the first resistor element in the first embodiment is coupled to the controller and variation in an output voltage per 1° C. variation in temperature when the second resistor element in the first embodiment is coupled to the controller, in two temperature ranges: a range of 0° C. to 50° C. and a range of 50° C. to 100° C.;

FIG. 15 is a table illustrating an example of a relation between a temperature and an output value of a digital signal;

FIG. 17 is a table illustrating variation in an output voltage per 1° C. variation in temperature when a first resistor element in the second embodiment is coupled to a controller and variation in an output voltage per 1° C. variation in temperature when a second resistor element in the second embodiment is coupled to the controller, in a range of 49° C. to 51° C. in steps of 1° C.;

FIG. 18 is a schematic view illustrating an example of the configuration of a detection part in a first modification in a plan view;

FIG. 21 is a schematic view illustrating an example of shapes and an arrangement of a first resistor element, a second resistor element, a third resistor element, a fourth resistor element, and a fifth resistor element in one partial temperature detection region in a fourth modification in a plan view; and FIG. 22 is a schematic view illustrating an example of the configuration of a detection part in a fifth modification in a plan view.

DETAILED DESCRIPTION

Figure 1:
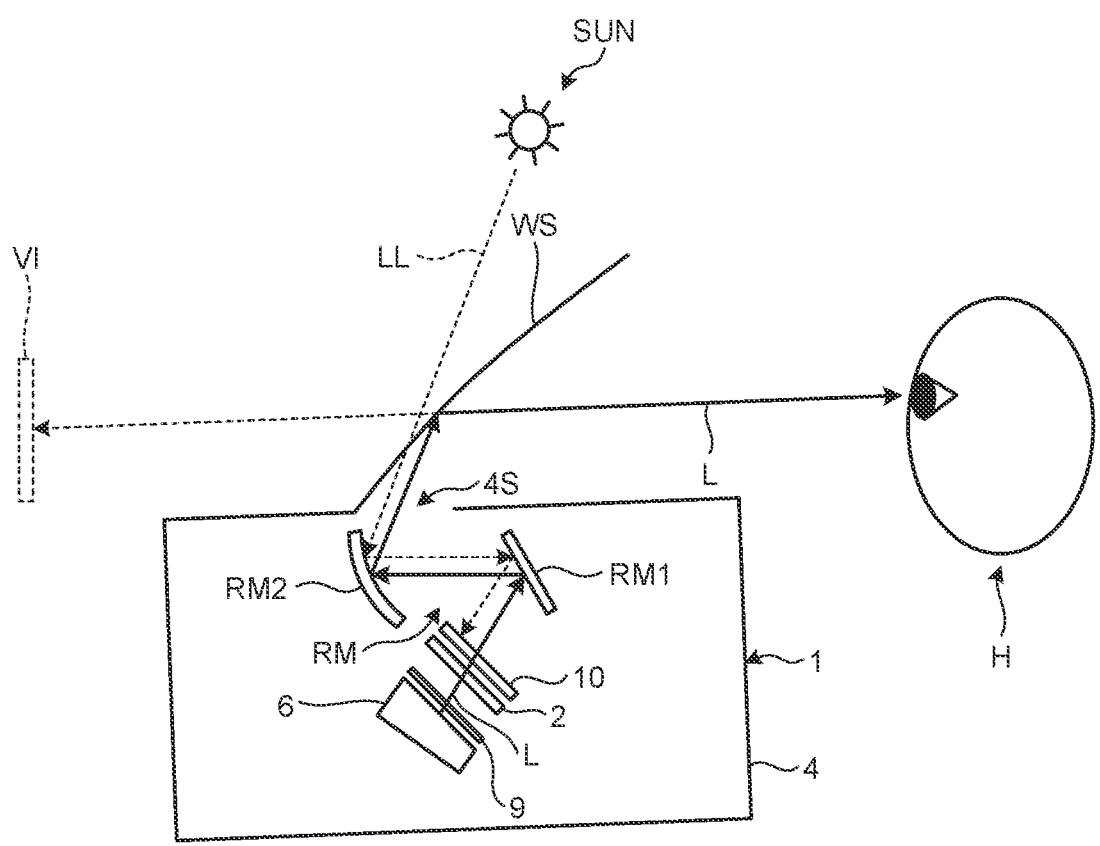
FIG. 1 is a descriptive diagram for schematically explaining an HUD device.

Hereinafter, embodiments of the present disclosure will be described with reference to the drawings. What is disclosed herein is merely an example, and it is needless to say that appropriate modifications within the gist of the invention of which those skilled in the art can easily think are encompassed in the scope of the present disclosure. In the drawings, widths, thicknesses, shapes, and the like of the components can be schematically illustrated in comparison with actual modes for more clear explanation. They are however merely examples and do not limit interpretation of the present disclosure. In the present specification and the drawings, the same reference numerals denote components similar to those described before with reference to the drawing that has been already referred, and detail explanation thereof can be appropriately omitted.

In this disclosure, when an element is described as being "on" another element, the element can be directly on the other element, or there can be one or more elements between the element and the other element.

First Embodiment

FIG. 1 is a descriptive diagram for schematically explaining a head up display (HUD) device 1. The HUD device 1 includes a light source 6, a diffusion plate 9, a display panel 2, and an optical system RM configured to enlarge an image from the display panel 2 and project the image onto a projection plate WS.

A housing 4 accommodates therein the light source 6 functioning as a light source device, the display panel 2 configured to output the image using light L from the light source 6, the diffusion plate 9 provided between the display panel 2 and the light source 6, the optical system RM, and a temperature detection device 10.

The light L emitted from the light source 6 is diffused by the diffusion plate 9 and reaches the display panel 2, so that a part or all of the light L passes through the display panel 2 to be light of the image. In the HUD device 1 in the first embodiment, the optical system RM including a mirror member RM1 and a mirror member RM2 guides the light L after passing through the display panel 2 to the projection plate WS. The mirror member RM1 is a plane mirror, and the mirror member RM2 is a concave mirror. The mirror member RM1 may be a concave mirror. The mirror member RM2 may be a plane mirror. The optical system RM is not limited thereto, and the optical system RM may include one mirror member, or three or more mirror members.

Light of the image that has passed through the optical system RM is reflected by the projection plate WS and reaches a user H to be recognized as an image VI in a field of view of the user H. That is to say, the HUD device 1 in the first embodiment functions as a display system configured to project the image onto the projection plate WS. It is sufficient that the projection plate WS is a member located on the sight line of the user H and having a light-transmitting property. The projection plate WS is, for example, a windscreen, a windshield, or a light-transmitting plate member called combiner in a vehicle, the combiner being provided as a separate member from the windscreen.

As illustrated in FIG. 1, in the HUD device 1, sunlight LL can be incident on an opening 4S of the housing 4 depending on a relative position of the sun SUN. The sunlight LL is guided by the optical system RM and is condensed toward the display panel 2 in some cases. The condensed sunlight possibly causes anomaly in the display panel 2 during operation. It is therefore desired to detect a partial heat generation state of a display region.

Thus, in the first embodiment, the temperature detection device 10 is provided on the mirror member RM1 side of the display panel 2. As illustrated in FIG. 1, the temperature detection device 10 is arranged on the mirror member RM1 side of the display panel 2 so as to receive light that has been guided by the optical system RM and condensed toward the display panel 2. The temperature detection device 10 is provided to be capable of detecting the temperature of the temperature detection device 10. Thus, in the embodiment, the temperature detection device 10 can detect temperature variation caused by light guided by the optical system RM and condensed toward the display panel 2. It is possible, by controlling operations of the display panel 2 based on the temperature variation generated in the temperature detection device 10, to restrain display output quality from being deteriorated in the display panel 2.

The temperature detection device 10 may be separated from the display panel 2 or abut against the display panel 2. The temperature detection device 10 may be provided integrally with the display panel 2.

Figure 2:
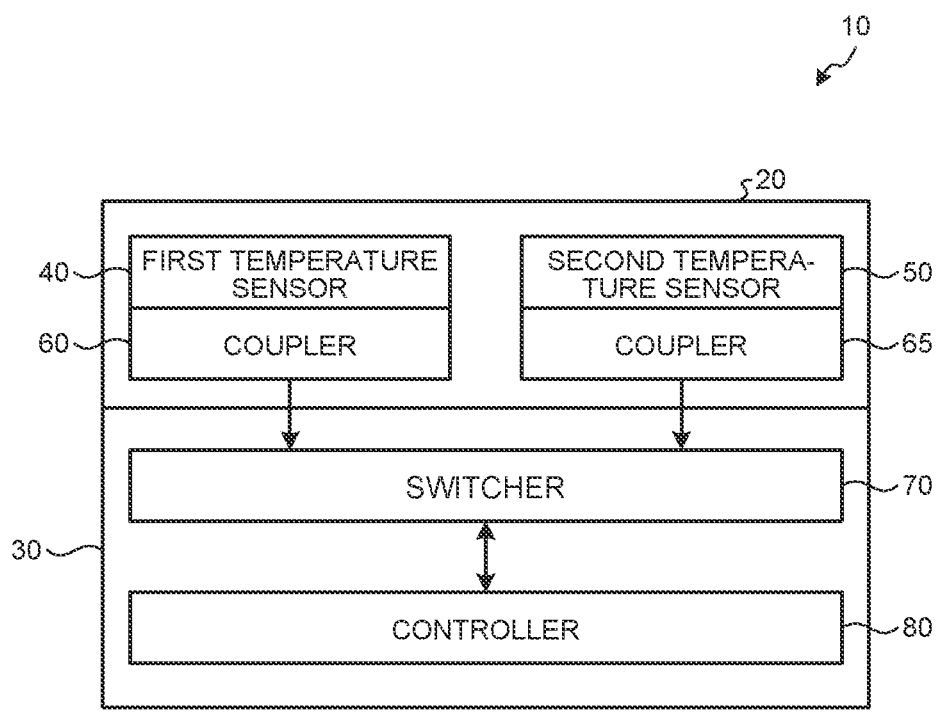
FIG. 2 is a block diagram illustrating an example of the main configuration of a temperature detection device.

FIG. 2 is a block diagram illustrating an example of the main configuration of the temperature detection device 10. The temperature detection device 10 includes a first temperature sensor 40, a second temperature sensor 50, couplers 60 and 65, a switcher 70, and a controller 80. The first temperature sensor 40, the second temperature sensor 50, and the couplers 60 and 65 are provided on, for example, a substrate 20. The switcher 70 and the controller 80 are provided on, for example, a flexible printed circuit (FPC) 30. The substrate 20 is a substrate having a light-transmitting property like a glass substrate, for example.

Figure 3:
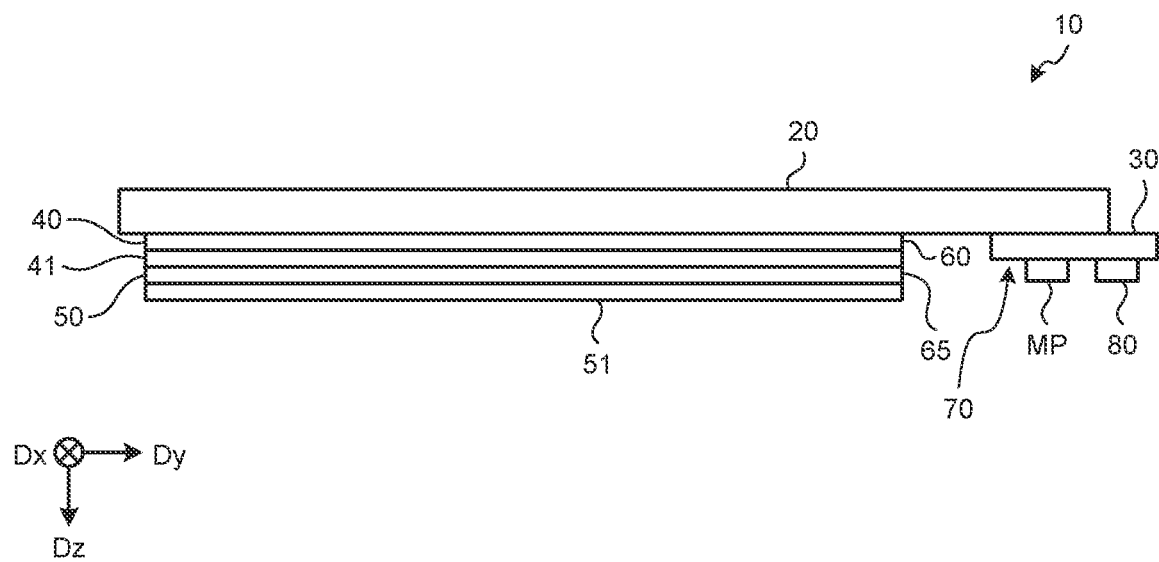
FIG. 3 is a schematic view illustrating an example of a multilayered structure of various components provided in the temperature detection device.

FIG. 3 is a schematic view illustrating an example of a multilayered structure of various components provided in the temperature detection device 10. As illustrated in FIG. 3, the first temperature sensor 40 and the second temperature sensor 50 are stacked on the substrate 20 with an insulating layer 41 interposed therebetween. A protection layer 51 is provided on the opposite side to the insulating layer 41 side with the second temperature sensor 50 interposed therebetween. The insulating layer 41 and the protection layer 51 are formed by, for example, thin films made of synthetic resin having a light-transmitting property. They are however not limited to be formed thereby. It is sufficient that the insulating layer 41 is a light-transmitting member electrically insulating the first temperature sensor 40 and the second temperature sensor 50 from each other. It is sufficient that the protection layer 51 is a light-transmitting member covering a stacked surface of the second temperature sensor 50 on the opposite side to the insulating layer 41 side.

Although the components of the first temperature sensor 40, the insulating layer 41, the second temperature sensor 50, and the protection layer 51 are stacked from the substrate 20 side in FIG. 3 in the order as listed, the arrangement of the first temperature sensor 40 and the second temperature sensor 50 may be reversed. Hereinafter, a stacking direction of the first temperature sensor 40, the insulating layer 41, the second temperature sensor 50, and the protection layer 51 on the substrate 20 is a third direction Dz, and two directions orthogonal to the third direction Dz is a first direction Dx and a second direction Dy. The first direction Dx is orthogonal to the second direction Dy. Hereinafter, the expression "plan view" denotes a viewpoint when a plane along the first direction Dx and the second direction Dy is viewed from the third direction Dz. The third direction Dz corresponds to an alignment direction of the mirror member RM1, the temperature detection device 10, and the display panel 2.

Figure 4:
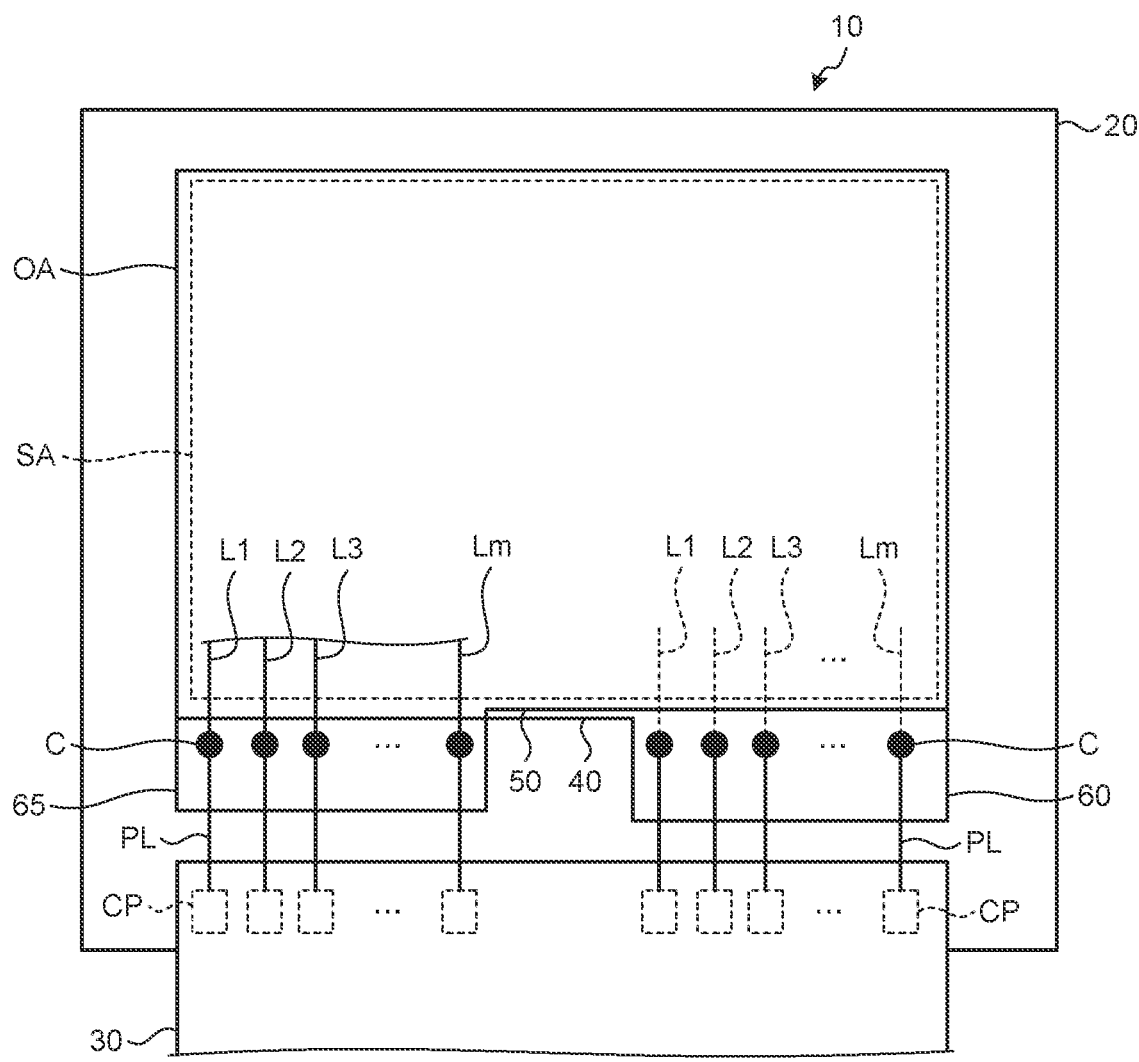
FIG. 4 is a schematic view when the temperature detection device is viewed in a plan view.

FIG. 4 is a schematic view when the temperature detection device 10 is viewed in a plan view. The coupler 60 extends from the first temperature sensor 40 to one end side in the second direction Dy. The coupler 65 extends from the second temperature sensor 50 to one end side in the second direction Dy. The coupler 60 and the coupler 65 are different in position in the first direction Dx. Each of the coupler 60 and the coupler 65 has a plurality of contacts C. The contacts C included in the coupler 60 individually couple wiring lines L1, L2, L3, . . . , and Lm provided in the first temperature sensor 40 to wiring lines PL provided on the substrate 20, respectively. The contacts C included in the coupler 65 individually couple wiring lines L1, L2, L3, . . . , and Lm provided in the second temperature sensor 50 to the wiring lines PL provided on the substrate 20, respectively.

The FPC 30 is provided on one end side in the second direction Dy on the substrate 20, for example, and is coupled to the wiring lines PL on the substrate 20 through coupling terminals CP. The FPC 30 may be further coupled to another wiring (not illustrated) provided on the substrate 20 through a coupling terminal other than the coupling terminals CP illustrated in FIG. 4.

As illustrated in FIG. 4, the wiring lines L1, L2, L3, . . . , and Lm of the first temperature sensor 40 and the second temperature sensor 50 extend from a detection part SA in which the first temperature sensor 40 and the second temperature sensor 50 overlap with each other in the third direction Dz.

Figure 5:
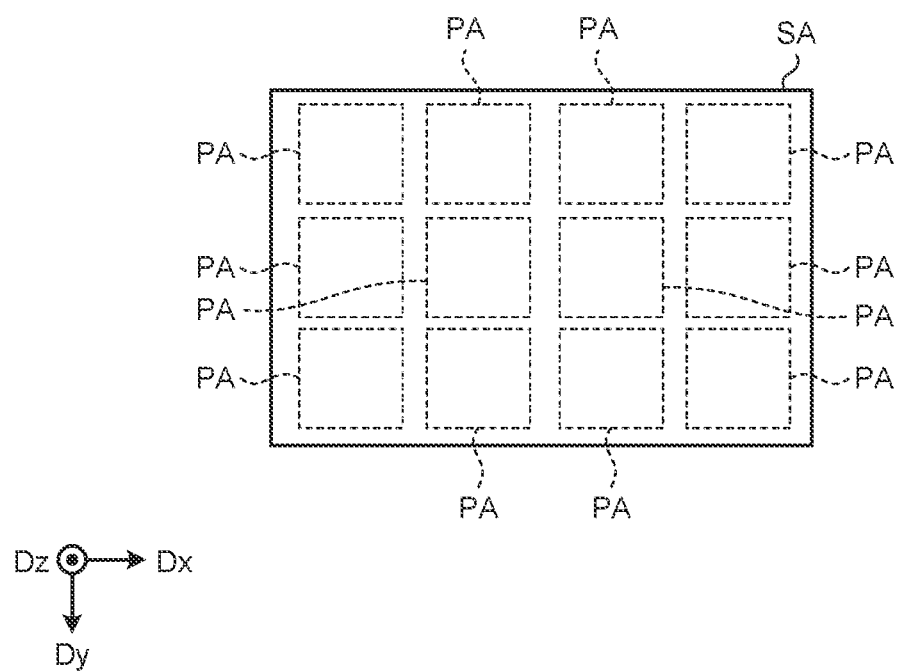
FIG. 5 is a schematic view illustrating an example of arrangement of a plurality of partial temperature detection regions that are conceptually present in the detection part, in a plan view.

FIG. 5 is a schematic view illustrating an example of arrangement of a plurality of partial temperature detection regions PA that are conceptually present in the detection part SA, in a plan view. As illustrated in FIG. 5, the detection part SA includes the partial temperature detection regions PA.

Figure 6:
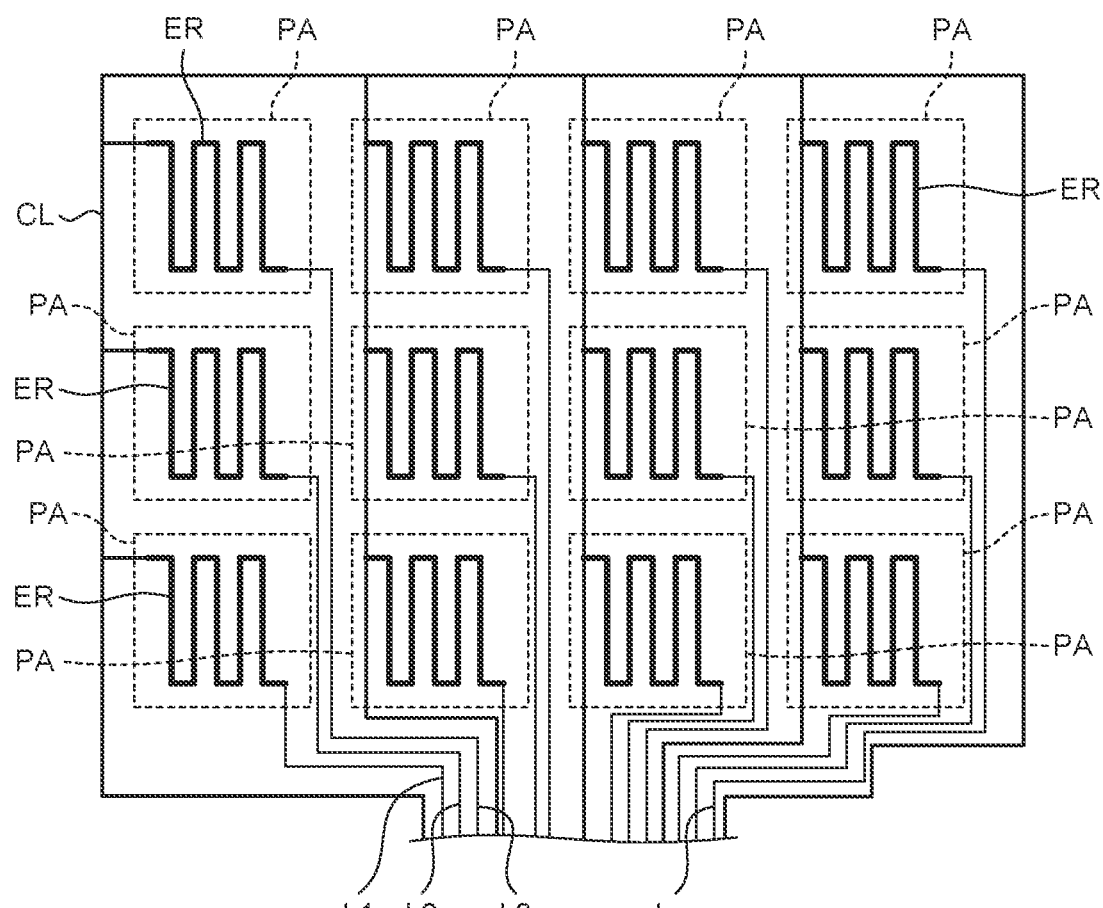
FIG. 6 is a schematic view illustrating an example of a relation between resistor elements that are individually provided in the respective partial temperature detection regions and various types of wiring coupled to the resistor elements, in a plan view.

FIG. 6 is a schematic view illustrating an example of a relation between resistor elements ER that are individually provided in the respective partial temperature detection regions PA and various types of wiring coupled to the resistor elements ER, in a plan view. As illustrated in FIG. 6, the resistor elements ER are provided in the respective partial temperature detection regions PA. Each resistor element ER is an electric resistor formed of compound (metal compound) containing an alloy or metal, or metal as a material. The resistor element ER may be a multilayered body formed by stacking a plurality of types of materials falling under at least one of the metal, alloy, and metal compound. An expression "alloy or the like" in explanation of the first embodiment denotes a material capable of being employed as a composition of the resistor elements ER. In the example illustrated in FIG. 6, each resistor element ER has such a shape that a plurality of L-shaped wiring lines each having a long side along the second direction Dy are coupled in the first direction Dx. With such a shape, the L-shaped wiring lines are coupled to form the shape of the resistor element ER such that the short sides of the two L-shaped wiring lines adjacent to each other in the first direction Dx are alternately arranged in the second direction Dy.

One end of each resistor element ER is coupled to a reference potential line CL. The reference potential line CL supplies a reference potential to the resistor element ER. The reference potential is what-is-called a ground potential (GND) in the first embodiment. The reference potential line CL is coupled to a frame ground such as a sheet metal (not illustrated) provided in the temperature detection device 10 and not coupled to an external power supply, or is coupled to a ground line of a power supply.

The other end of each resistor element ER is coupled to any one of the wiring lines L1, L2, L3, . . . , and Lm. The resistor elements ER to which the wiring lines L1, L2, L3, . . . , and Lm are respectively coupled are different from one another. That is to say, m corresponds to the number of resistor elements ER. m is a natural number. Each resistor element ER functions as an electrode interposed between the reference potential line CL and any one of the wiring lines L1, L2, L3, . . . , and Lm.

Figure 12:
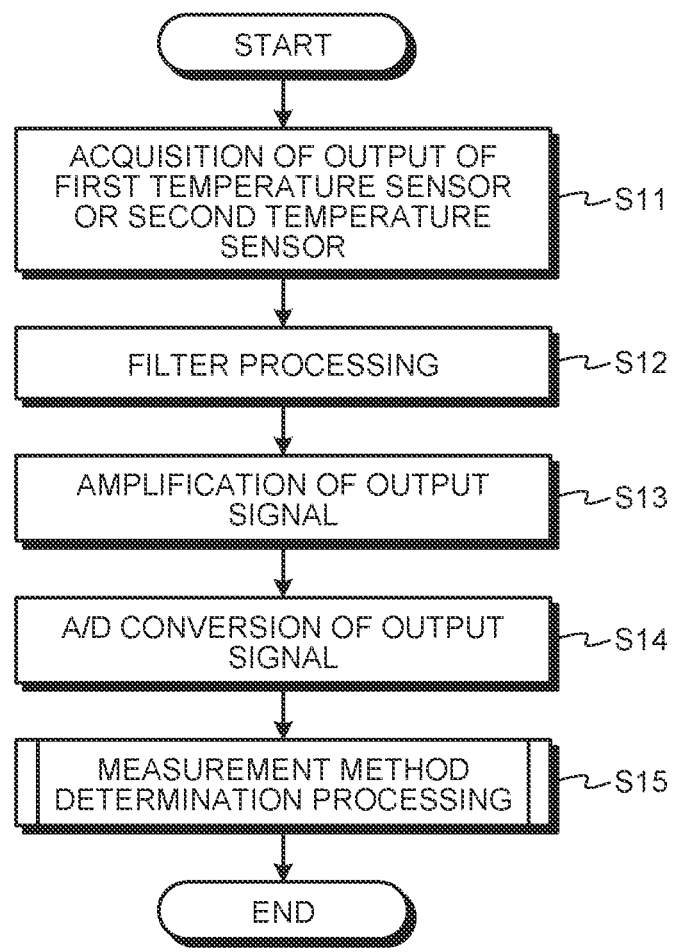
FIG. 12 is a flowchart illustrating an example of the flow of processing related to temperature measurement.

In the example illustrated in FIG. 5 and FIG. 6, 12 partial temperature detection regions PA of 4×3 are arranged in a Dx-Dy plan view. This is however merely an example, and the arrangement and the number of partial temperature detection regions PA are desirably set.

Each of the first temperature sensor 40 and the second temperature sensor 50 includes the resistor elements ER. Consequently, each of the first temperature sensor 40 and the second temperature sensor 50 has the detection part SA including the partial temperature detection regions PA. The detection part SA included in the first temperature sensor 40 and the detection part SA included in the second temperature sensor 50 overlap with each other in the third direction Dz. The arrangement of the partial temperature detection regions PA included in the detection part SA in the first temperature sensor 40 and the arrangement of the partial temperature detection regions PA included in the detection part SA in the second temperature sensor 50 are the same as each other. However, the resistor elements ER provided in the first temperature sensor 40 and the resistor elements ER provided in the second temperature sensor 50 have different compositions.

In explanation with reference to FIG. 7 described later, the resistor elements ER provided in the first temperature sensor 40 among the resistor elements ER are first resistor elements ERa. In explanation with reference to FIG. 7, the resistor elements ER provided in the second temperature sensor 50 among the resistor elements ER are second resistor elements ERb. Thus, the first resistor elements ERa and the second resistor elements ERb have different compositions. Although the first temperature sensor 40 and the second temperature sensor 50 overlap with each other as described above, FIG. 7 illustrates a state where these sensors displaced from each other in the right-left direction in order to facilitate the understanding.

Figure 7:
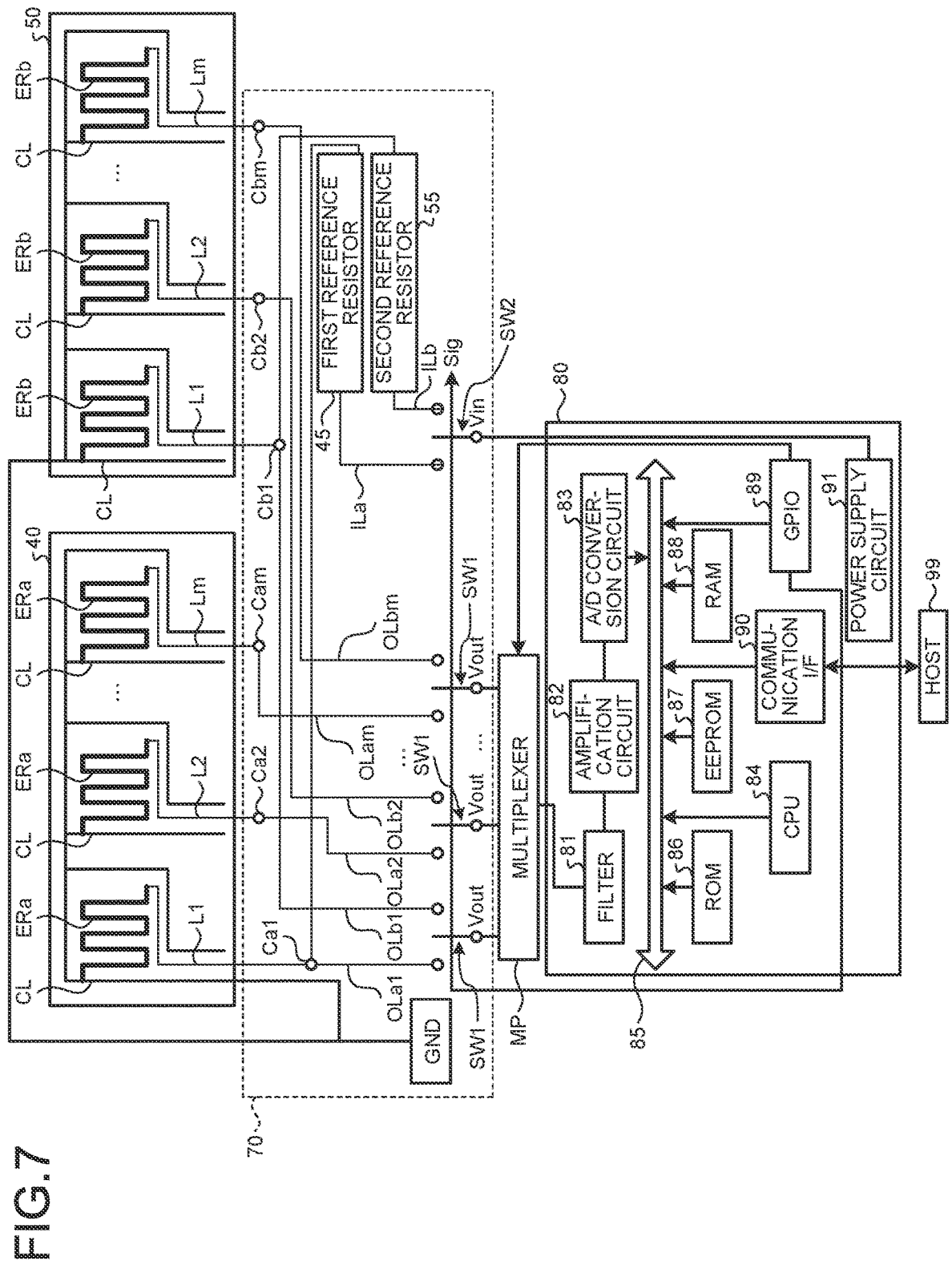
FIG. 7 is a schematic circuit diagram illustrating an example of a coupling mode between a controller 80 and the resistor elements including a plurality of first resistor elements and a plurality of second resistor elements through a switcher and a multiplexer, and an example of the main configuration of the controller 80.

FIG. 7 is a schematic circuit diagram illustrating an example of a coupling mode between the controller 80 and the resistor elements ER including the first resistor elements ERa and the second resistor elements ERb through the switcher 70 and a multiplexer MP, and an example of the main configuration of the controller 80.

The switcher 70 couples either the first resistor elements ERa or the second resistor elements ERb to the controller 80. To be specific, the switcher 70 has output lines OLa1, OLa2, . . . , and OLam, output lines OLb1, OLb2, . . . , and OLbm, a plurality of switches SW1, contacts Ca1, Ca2, . . . , and Cam, contacts Cb1, Cb2, . . . , and Cbm, a first reference resistor 45, a second reference resistor 55, an input line ILa, an input line ILb, and a switch SW2.

The output lines OLa1, OLa2, . . . , and OLam are coupled to the wiring lines L1, L2, . . . , and Lm coupled to the first resistor elements ERa on a one-to-one basis. In FIG. 7, the output line OLa1 and the wiring line L1 are coupled to each other, the output line OLa2 and the wiring line L2 are coupled to each other, . . . , and the output line OLam and the wiring line Lm are coupled to each other.

The output lines OLb1, OLb2, . . . , and OLbm are coupled to the wiring lines L1, L2, . . . , and Lm coupled to the second resistor elements ERb on a one-to-one basis. In FIG. 7, the output line OLb1 and the wiring line L1 are coupled to each other, the output line OLb2 and the wiring line L2 are coupled to each other, . . . , and the output line OLbm and the wiring line Lm are coupled to each other.

The switches SW1 are circuits functioning as switches. One of the switches SW1 is provided capable of performing a switching operation so as to be coupled to one of the output line OLa1 and the output line OLb1. Another one of the switches SW1 is provided capable of performing a switching operation so as to be coupled to one of the output line OLa2 and the output line OLb2. The number of switches SW1 is m. Another switch SW1 differing from the above-mentioned two switches SW1 among the switches SW1 is provided capable of performing a switching operation so as to be coupled to one of the output line OLam and the output line OLbm. That is to say, each of the m switches SW1 is provided capable of performing a switching operation so as to be coupled to one of the output line OLak to which the first resistor element ERa is coupled and the output line OLbk. k is any one natural number in a range of 1 to m.

Each of the contacts Ca1, Ca2, . . . , and Cam is electrically coupled to the output line OLak and the wiring line Lk coupled to the first resistor element ERa. The contact Ca1 is coupled to the output line OLa1 and the wiring line L1, the contact Ca2 is coupled to the output line OLa2 and the wiring line L2, . . . , and the contact Cam is coupled to the output line OLam and the wiring line Lm.

Each of the contacts Cb1, Cb2, . . . , and Cbm is electrically coupled to the output line OLbk and the wiring line Lk coupled to the second resistor element ERb. The contact Cb1 is coupled to the output line OLb1 and the wiring line L1, the contact Cb2 is coupled to the output line OLb2 and the wiring line L2, . . . , and the contact Cbm is coupled to the output line OLbm and the wiring line Lm.

The first reference resistor 45 is coupled to the first resistor element ERa by being coupled to the contact Ca1. Although not illustrated in the drawing, a component similar to the first reference resistor 45 is also coupled to each of the contacts Ca2, . . . , and Cam. One first reference resistor 45 may be coupled to the contacts Ca1, Ca2, . . . , and Cam to be shared among them, or m first reference resistors 45 that are coupled to the respective contacts Ca1, Ca2, and Cam may be provided.

The second reference resistor 55 is coupled to the second resistor element ERb by being coupled to the contact Cb1. Although not illustrated in the drawing, a component similar to the second reference resistor 55 is also coupled to each of the contacts Cb2, . . . , and Cbm. One second reference resistor 55 may be coupled to the contacts Cb1, Cb2, . . . , and Cbm to be shared among them, or m second reference resistors 55 that are coupled to the respective contacts Cb1, Cb2, . . . , and Cbm may be provided.

The first reference resistor 45 and the second reference resistor 55 are electric resistors having different electric resistance values. The electric resistance value of the first reference resistor 45 is set so as to correspond to the specific configuration of the first resistor element ERa. The electric resistance value of the second reference resistor 55 is set so as to correspond to the specific configuration of the second resistor element ERb.

The input line ILa is coupled to the first resistor element ERa by being coupled to the first reference resistor 45. The input line ILb is coupled to the second resistor element ERb by being coupled to the second reference resistor 55. The switch SW2 is a circuit functioning as a switch provided capable of performing a switching operation so as to be coupled to one of the input line ILa and the input line ILb.

In the first embodiment, the switches SW1 operate so as to be electrically coupled to either the first resistor elements ERa or the second resistor elements ERb. The switch SW2 is coupled to the input line ILa when the switches SW1 are electrically coupled to the first resistor elements ERa whereas the switch SW2 is coupled to the input line ILb when the switches SW1 are electrically coupled to the second resistor elements ERb. That is to say, the switch SW2 is coupled to the input line ILa when the switches SW1 are coupled to the output lines OLa1, OLa2, . . . , and OLam whereas the switch SW2 is coupled to the input line ILb when the switches SW1 are coupled to the output lines OLb1, OLb2, . . . , and OLbm. The controller 80 controls the operations of the switches SW1 and the operations of the switch SW2.

In the first embodiment, the multiplexer MP is interposed between the controller 80 and the switches SW1. The multiplexer MP couples any one of the switches SW1 to the controller 80. The multiplexer MP changes the switch SW1 to be coupled to the controller 80 by shifting regularly the switch SW1 to be coupled to the controller from one to another among the switches SW1. With this operation, an electric circuit that is coupled to one of the first resistor elements ERa or one of the second resistor elements ERb is coupled to the controller 80.

Figure 8:
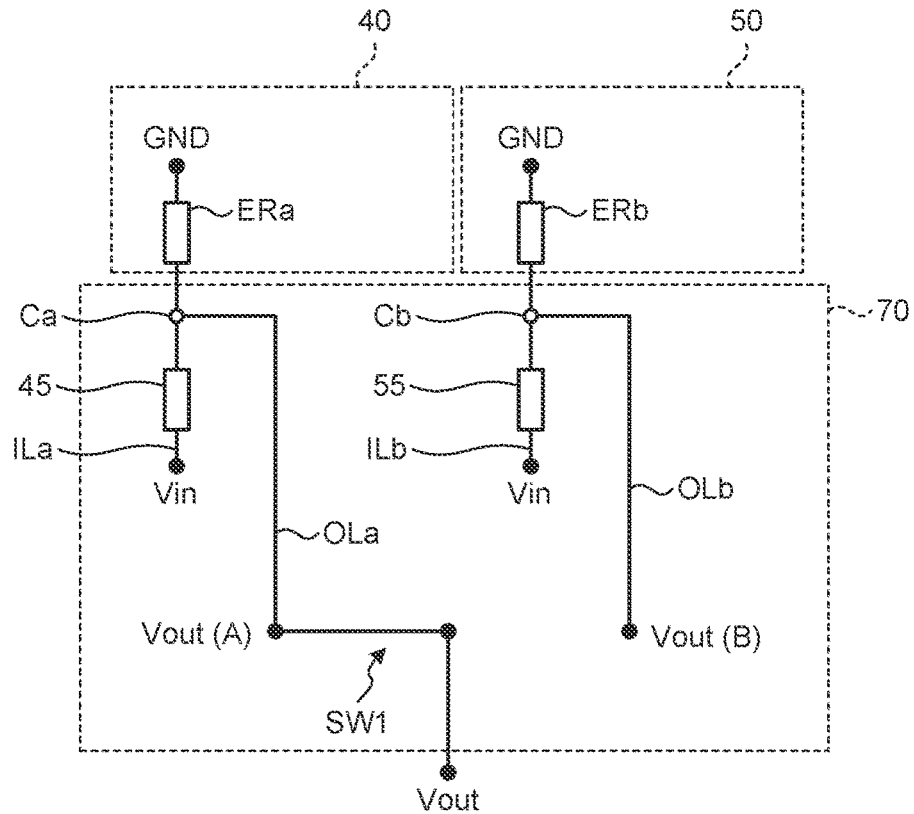
FIG. 8 is a schematic simplified circuit diagram illustrating an input/output system that is achieved by various components illustrated in FIG. 7 and is provided to be capable of being coupled to either of one first resistor element or one second resistor element.

FIG. 8 is a schematic simplified circuit diagram illustrating an input/output system that is achieved by various components illustrated in FIG. 7 and is provided to be capable of being coupled to either one first resistor element ERa or one second resistor element ERb. Hereinafter, among the output lines OLa1, OLa2, . . . , and OLam in FIG. 7, the one that is provided to be capable of being coupled to one switch SW1 coupled to the controller 80 by the multiplexer MP is an output line OLa. Among the contacts Ca1, Ca2, . . . , and Cam in FIG. 7, the one that is coupled to the output line OLa is a contact Ca. Among the output lines OLb1, OLb2, . . . , and OLbm in FIG. 7, the one that is provided to be capable of being coupled to one switch SW1 coupled to the controller 80 by the multiplexer MP is an output line OLb. Among the contacts Cb1, Cb2, . . . , and Cbm in FIG. 7, the one that is coupled to the output line OLb is a contact Cb.

In the input/output system illustrated in FIG. 8, an electric signal generated in accordance with application of a voltage to an input Vin is output from an output Vout. Hereinafter, the electric signal is referred to as an output signal. The input Vin is coupled to the switch SW2 in FIG. 7. As illustrated in FIG. 7 and FIG. 8, the output Vout is coupled to the switch SW1.

When the switch SW1 is coupled to the output line OLa, a current generated in accordance with the application of the voltage to the input Vin tries to flow toward a ground GND. The flow of the current toward the ground GND is however inhibited in accordance with a volume resistivity of the first resistor element ERa, so that a current toward the output line OLa is generated. The current flowing toward the output line OLa generates the output signal at the output Vout. That is to say, as the volume resistivity of the first resistor element ERa is higher, the output signal is strengthened.

When the switch SW1 is coupled to the output line OLb, a current generated in accordance with the application of the voltage to the input Vin tries to flow toward the ground GND. The flow of the current toward the ground GND is however inhibited in accordance with a volume resistivity of the second resistor element ERb, so that a current toward the output line OLb is generated. The current flowing toward the output line OLb generates the output signal at the output Vout. That is to say, as the volume resistivity of the second resistor element ERb is higher, the output signal is strengthened.

A circuit including the input line ILa, the first reference resistor 45, the contact Ca, the first resistor element ERa, and the output line OLa functions as a first circuit in the first embodiment. A circuit including the input line ILb, the second reference resistor 55, the contact Cb, the second resistor element ERb, and the output line OLb functions as a second circuit in the first embodiment.

Figure 9:
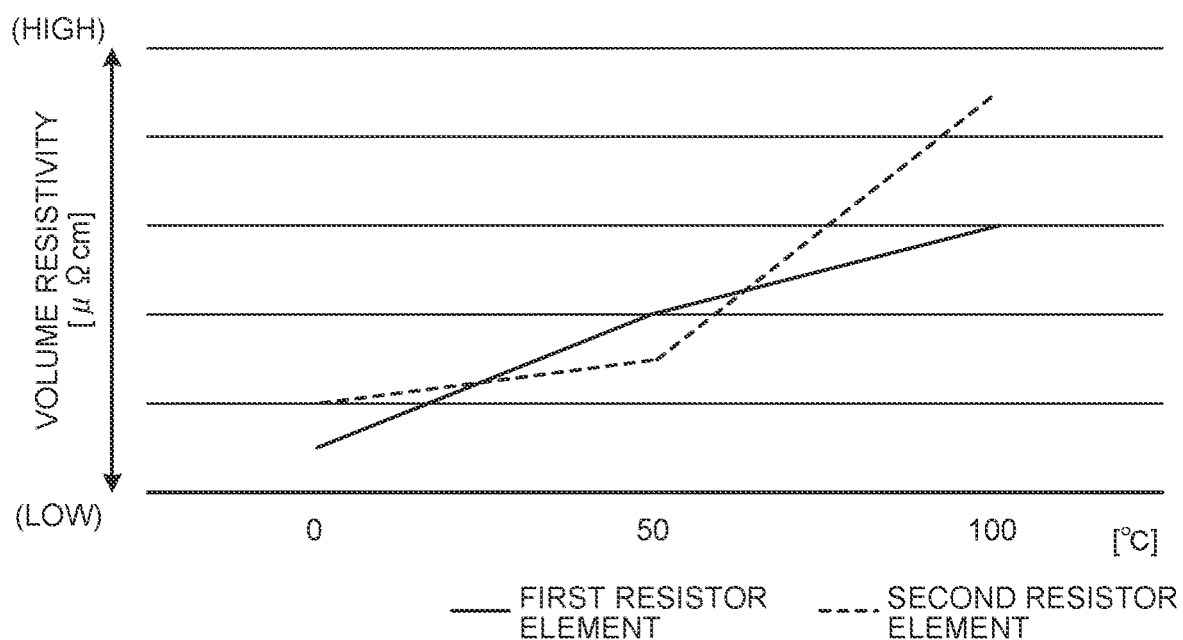
FIG. 9 is a graph illustrating an example of a relation between a temperature of the first resistor element and a volume resistivity of the first resistor element and a relation between a temperature of the second resistor element and a volume resistivity of the second resistor element.

FIG. 9 is a graph illustrating an example of a relation between the temperature of the first resistor element ERa and the volume resistivity of the first resistor element ERa and a relation between the temperature of the second resistor element ERb and the volume resistivity of the second resistor element ERb. As described above, the composition of the first resistor elements ERa and the composition of the second resistor elements ERb are different from each other. Consequently, as illustrated in FIG. 9, the relation between the temperature of the first resistor element ERa and the volume resistivity of the first resistor element ERa and the relation between the temperature of the second resistor element ERb and the volume resistivity of the second resistor element ERb are different from each other. In the example of FIG. 9, the increase degree of the volume resistivity of the first resistor element ERa relative to the temperature increase of the first resistor element ERa is higher than the increase degree of the volume resistivity of the second resistor element ERb relative to the temperature increase of the second resistor element ERb in a range of equal to or lower than 50° C. In the example illustrated in FIG. 9, the increase degree of the volume resistivity of the second resistor element ERb relative to the temperature increase of the second resistor element ERb is higher than the increase degree of the volume resistivity of the first resistor element ERa relative to the temperature increase of the first resistor element ERa in a range of equal to or higher than 50° C.

Figure 10:
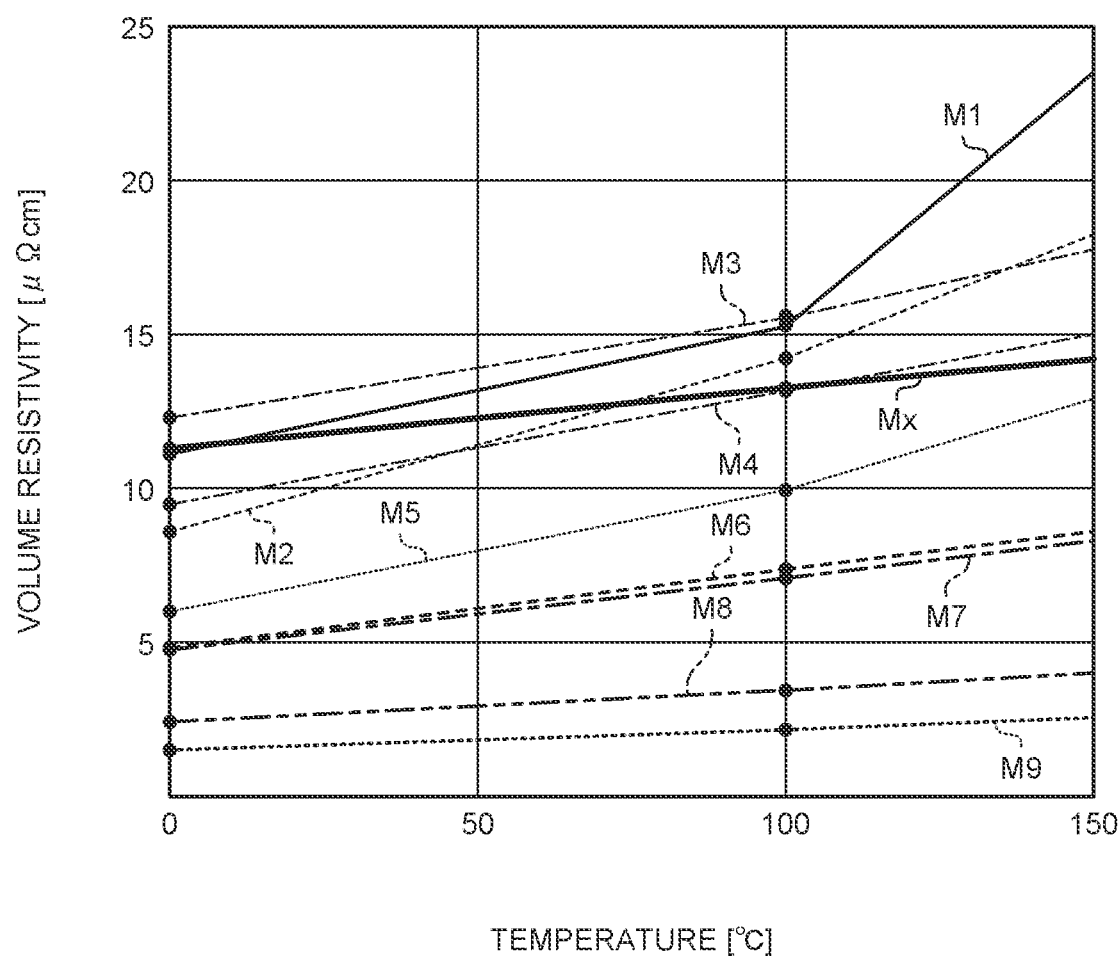

FIG. 10 is a graph illustrating relations between temperatures and volume resistivities of metals differing from one another and a relation between a temperature and a volume resistivity of a certain alloy or the like. Graphs M1, M2, M3, M4, M5, M6, M7, M8, and M9 illustrated in FIG. 10 indicate the relations between the temperatures and the volume resistivities of the metals differing from one another. As indicated by the graphs M1, M2, M3, M4, M5, M6, M7, M8, and M9, the relation between the temperature and the volume resistivity is different between different metals. The relation between the temperature and the volume resistivity of the alloy or the like can be made different from that of metal (original metal) that is used as a material for the alloy or the like depending on the selection of the original metal. For example, FIG. 10 illustrates a graph Mx for the alloy or the like indicating that the relation between the temperature and the volume resistivity is different from all of the graphs M1, M2, M3, M4, M5, M6, M7, M8, and M9. The first resistor elements ERa and the second resistor elements ERb can be manufactured by making the original metals thereof different from each other based on the above-mentioned concept.

Next, the controller 80 that is coupled to the first resistor element ERa or the second resistor element ERb through the multiplexer MP will be described. For example, as illustrated in FIG. 7, the controller 80 includes a filter 81, an amplification circuit 82, an analog-to-digital (A/D) conversion circuit 83, a central processing unit (CPU) 84, a bus 85, a read only memory (ROM) 86, an electrically erasable programmable read only memory (EEPROM) 87, a random access memory (RAM) 88, a general purpose input output (GPIO) 89, a communication interface (IF) 90, and a power supply circuit 91.

The filter 81 is a filter circuit that removes noise from the output signal obtained at the output Vout of the switch SW1 coupled to the filter through the multiplexer MP. The amplification circuit 82 amplifies the output signal obtained by noise processing by the filter 81. The A/D conversion circuit 83 converts the analog output signal obtained by amplification performed by the amplification circuit 82 into a digital signal.

The CPU 84 of the controller 80 performs various pieces of arithmetic processing such as processing based on the digital signal generated by the A/D conversion circuit 83.

The bus 85 functions as a transmission path of various digital signals in the controller 80, and for example, it transmits the digital signal output from the A/D conversion circuit 83 to the CPU 84. The A/D conversion circuit 83, the CPU 84, the ROM 86, the EEPROM 87, the RAM 88, the GPIO 89, and the communication IF 90 are coupled to the bus 85.

The ROM 86 stores therein computer programs and the like in a non-rewritable manner. The computer programs and the like include a software program that is read out in processing by the CPU 84 and data that is referred in execution of the software program. The EEPROM 87 stores therein the computer programs and the like in a rewritable manner. The RAM 88 temporarily stores therein various data and parameters that are generated with execution processing of the computer program and the like by the CPU 84.

The GPIO 89 transmits a signal to the outside in response to an output received from the CPU 84 or the like through the bus 85. For example, a signal for an operation of switching the switch SW1 and the switch SW2 is an output from the CPU 84 and is transmitted to the switch SW1 and the switch SW2 through the bus 85 and the GPIO 89. The GPIO 89 functions also as an input path through which an input of a signal from an external apparatus is received by the bus 85. The communication IF 90 includes a circuit for functioning as a network interface controller (NIC) and makes communication with an external communication apparatus. The power supply circuit 91 applies a voltage to the input Vin.

As illustrated in FIG. 3, the switcher 70, the multiplexer MP, and the controller 80 are provided on, for example, the FPC 30 but are not limited to be provided thereon. Alternatively, they may be provided on the substrate 20 and be coupled to the first temperature sensor 40 and the second temperature sensor 50 through the wiring lines PL and the coupler 60 or the coupler 65. The specific configuration of the controller 80 illustrated in FIG. 7 is merely an example and non-limiting, and it can be appropriately changed. For example, the ROM 86 may be rewritable such as a flash ROM, and the communication IF 90 may be a serial peripheral interface (SPI), an inter integrated circuit (I2C), or the like.

Hereinafter, an example of various pieces of processing that the controller 80 performs will be described with reference to flowcharts in FIG. 11 to FIG. 13.

Figure 11:
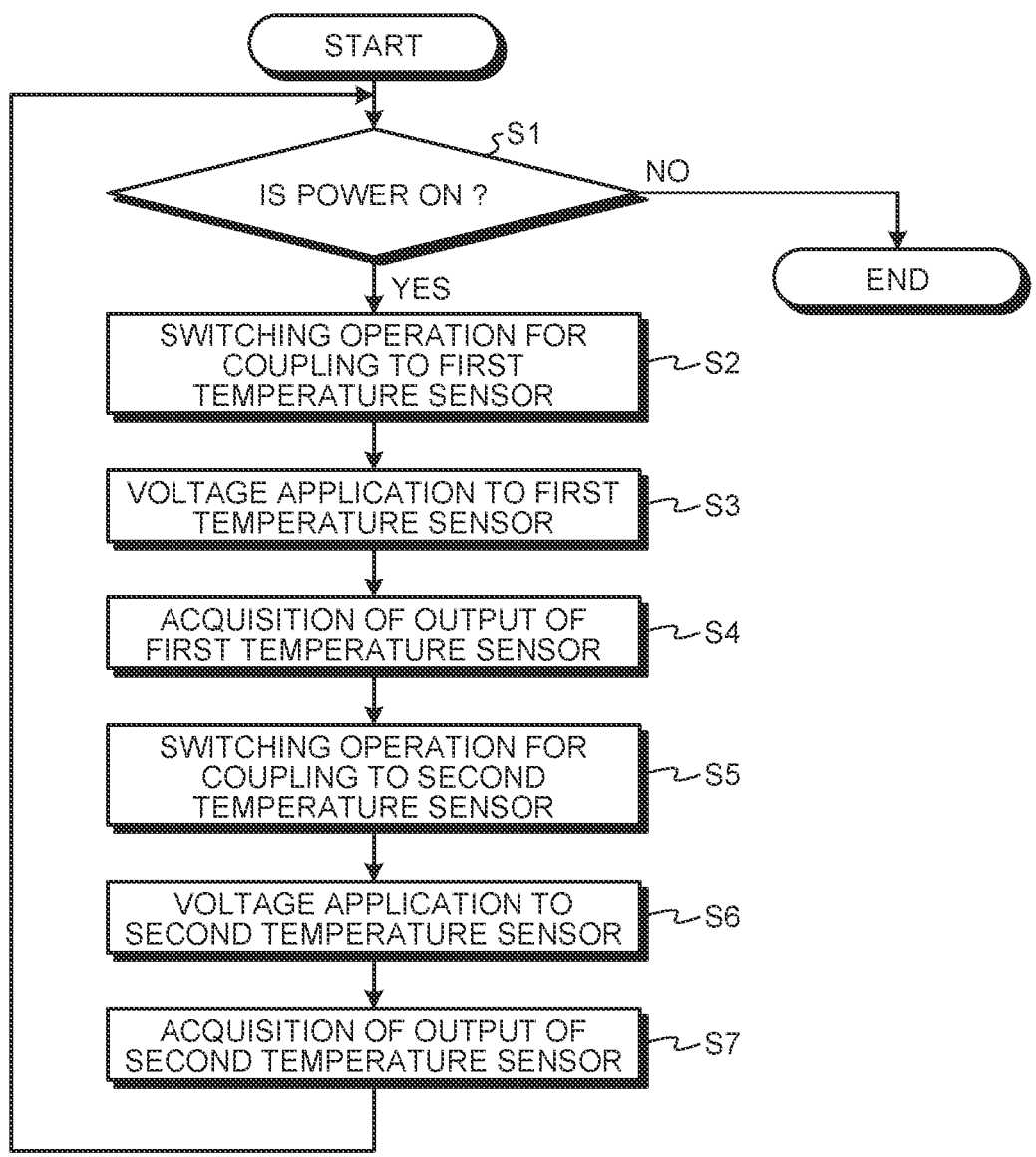
FIG. 11 is a flowchart illustrating an example of the flow of a switching operation of a target that is coupled to the controller through a switch and another switch.

FIG. 11 is a flowchart illustrating an example of the flow of a switching operation of a target that is coupled to the controller 80 through the switch SW1 and the switch SW2. First, a branch point is provided in which whether to perform the switching process is determined depending on whether the power of the temperature detection device 10 is ON (step S1). When the power of the temperature detection device 10 is OFF (No at step S1), the processing is not performed.

When the power of the temperature detection device 10 is ON (Yes at step S1), the CPU 84 performs the switching operation of the switch SW1 and the switch SW2 for coupling to the first temperature sensor 40 (step S2). To be specific, the CPU 84 operates the switch SW1 to be coupled to the output line OLa and operates the switch SW2 to be coupled to the input line ILa. Thus, the first resistor element ERa of the first temperature sensor 40 is coupled to the controller 80. After the processing at step S2, a voltage is applied to the first temperature sensor 40 (step S3). To be specific, the power supply circuit 91 applies the voltage to the input Vin. Then, an output of the first temperature sensor 40 is acquired (step S4). To be specific, the output signal is acquired from the output Vout in accordance with the voltage application in the processing at step S3. The output signal is input to the filter 81 through the multiplexer MP.

After the processing at step S4, the CPU 84 performs the switching operation of the switch SW1 and the switch SW2 for coupling to the second temperature sensor 50 (step S5). To be specific, the CPU 84 operates the switch SW1 to be coupled to the output line OLb and operates the switch SW2 to be coupled to the input line ILb. Thus, the second resistor element ERb of the second temperature sensor 50 is coupled to the controller 80. After the processing at step S5, a voltage is applied to the second temperature sensor 50 (step S6). To be specific, the power supply circuit 91 applies the voltage to the input Vin. Then, an output of the second temperature sensor 50 is acquired (step S7). To be specific, the output signal is acquired from the output Vout in accordance with the voltage application in the processing at step S6. The output signal is input to the filter 81 through the multiplexer MP. After the processing at step S7, the process proceeds to the branch point at step S1.

As described above, the CPU 84 operates the switch SW1 and the switch SW2 such that the target to be coupled to the controller 80 is periodically switched between the first temperature sensor 40 and the second temperature sensor 50.

The controller 80 performs processing related to temperature measurement based on acquisition of the output of the first temperature sensor 40 or the second temperature sensor 50. FIG. 12 is a flowchart illustrating an example of the flow of the processing related to the temperature measurement. First, an output of the first temperature sensor 40 or the second temperature sensor 50 is acquired (step S11). The processing at step S11 corresponds to the processing at step S4 or the processing at step S7 described with reference to FIG. 11.

The filter 81 performs filter processing on the output signal acquired in the processing at step S11 (step S12). The amplification circuit 82 amplifies the output signal on which the filter processing has been performed in the processing at step S12 (step S13). The A/D conversion circuit 83 performs the A/D conversion processing of converting the analog output signal amplified in the processing at step S13 into a digital signal (step S14).

The CPU 84 performs measurement method determination processing based on the output signal converted into the digital signal in the processing at step S14 (step S15).

Figure 13:
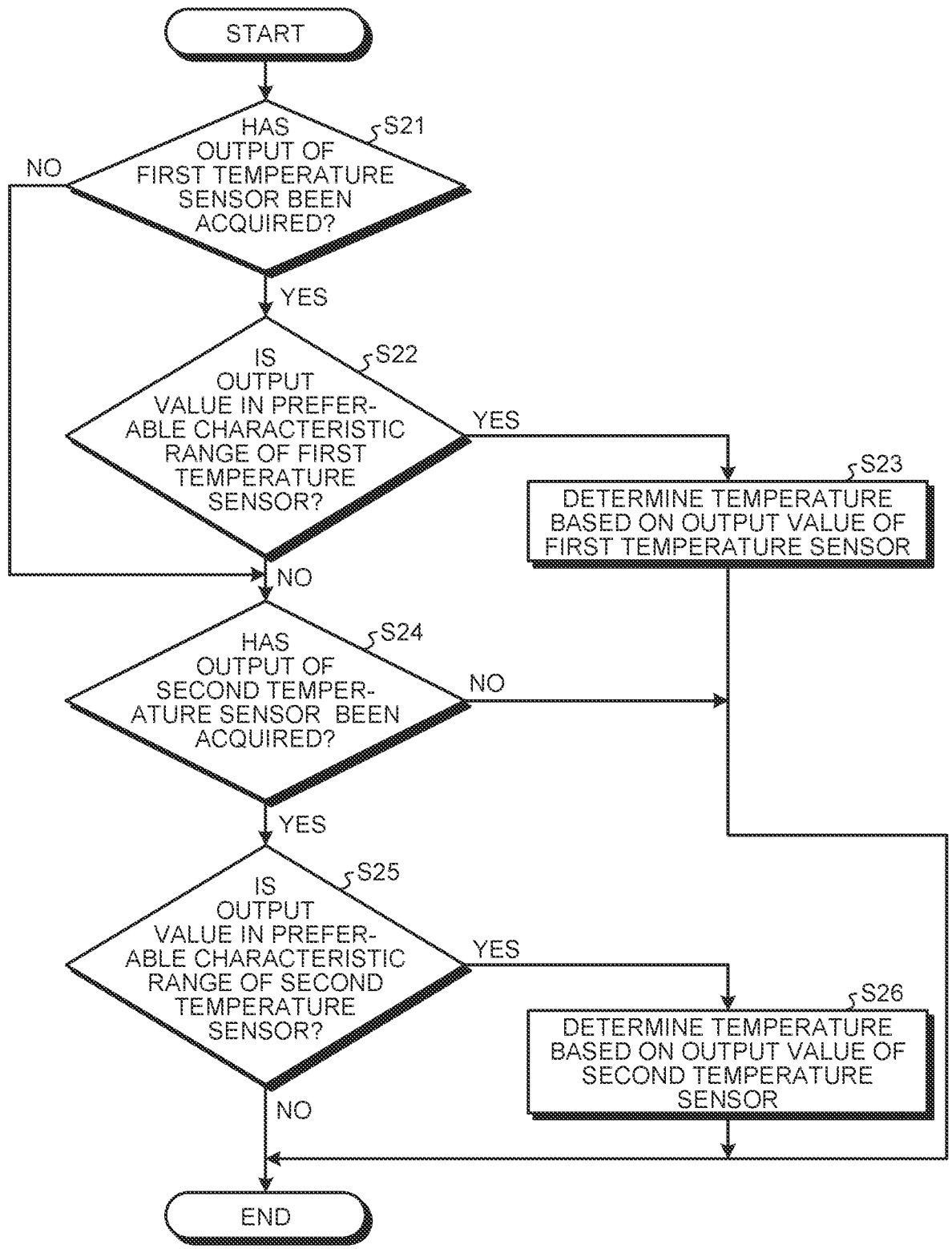
FIG. 13 is a flowchart illustrating an example of the flow of measurement method determination processing in a first embodiment.

FIG. 13 is a flowchart illustrating an example of the flow of the measurement method determination processing in the first embodiment. The CPU 84 determines whether the output of the first temperature sensor 40 has been acquired in the processing at step S11 (step S21). When the output of the first temperature sensor 40 has been acquired (Yes at step S21), the CPU 84 determines whether an output value indicated by the output signal converted into the digital signal in the processing at step S14 is in a preferable characteristic range of the first temperature sensor 40 (step S22).

The preferable characteristic range is described herein. The preferable characteristic range denotes a temperature range in which the output value changes relative to temperature variation to a degree that the temperature of the temperature detection device 10 can be determined by a margin equal to or lower than a predetermined temperature (for example, by a margin equal to or lower than 1° C.).

FIG. 14 is a table individually illustrating variation in an output voltage per 1° C. variation in temperature when the first resistor element ERa in the first embodiment is coupled to the controller 80 and variation in the output voltage per 1° C. variation in temperature when the second resistor element ERb in the first embodiment is coupled to the controller 80, in two temperature ranges: the range of 0° C. to 50° C. and the range of 50° C. to 100° C. The output voltage denotes a voltage that is generated by the output signal. Numerical values illustrated in FIG. 14 are merely examples and are not limiting, and the numerical values vary depending on the specific configuration of the first resistor elements ERa and the specific configuration of the second resistor elements ERb.

In the example illustrated in FIG. 14, the variation in the output voltage relative to the temperature variation of 1° C. when the first resistor element ERa is coupled to the controller 80 is 10 in the temperature range of 0° C. to 50° C. (first temperature range). On the other hand, the variation in the output voltage relative to the temperature variation of 1° C. when the second resistor element ERb is coupled to the controller 80 is 2 in the temperature range of 0° C. to 50° C. As described above, in the example illustrated in FIG. 14, the variation in the output voltage relative to the temperature variation of 1° C. in the temperature range of 0° C. to 50° C. is larger in the case where the first resistor element ERa is coupled to the controller 80 than in the case where the second resistor element ERb is coupled to the controller 80. This is because, in the range of equal to or lower than 50° C., the increase degree of the volume resistivity of the first resistor element ERa relative to the temperature increase of the first resistor element ERa is higher than the increase degree of the volume resistivity of the second resistor element ERb relative to the temperature increase of the second resistor element ERb, as illustrated in the example of FIG. 9. That is to say, in the input/output system illustrated in FIG. 8, since the increase degree of the volume resistivity of the first resistor element ERa relative to the temperature increase of the first resistor element ERa is higher in the range of equal to or lower than 50° C., variation in the output Vout in accordance with the temperature variation also becomes larger. In other words, the first resistor element ERa has higher sensitivity than that of the second resistor element ERb in the temperature range of 0° C. to 50° C.

In the example described with reference to FIG. 14, temperature determination accuracy based on the output value can be further enhanced in the case where the first resistor element ERa is coupled to the controller 80 rather than the case where the second resistor element ERb is coupled to the controller 80 in the temperature range of 0° C. to 50° C. Therefore, when the output of the first temperature sensor 40 has been acquired in the processing at step S21 (Yes at step S21), that is, when the output signal has been acquired in the state where the first resistor element ERa is coupled to the controller 80 and an output value expected to be obtained in the case where the first resistor element ERa is coupled to the controller 80 in the temperature range of 0° C. to 50° C. has been acquired, the CPU 84 determines that the output value indicated by the output signal converted into the digital signal in the processing at step S14 is in the preferable characteristic range of the first temperature sensor 40 (Yes at step S22).

When the output value indicated by the output signal converted into the digital signal in the processing at step S14 is determined to be in the preferable characteristic range of the first temperature sensor 40 (Yes at step S22), the CPU 84 determines the temperature of the temperature detection device 10 based on the output value of the first temperature sensor 40 (step S23).

FIG. 15 is a table illustrating an example of a relation between the temperature and the output value of the digital signal. As illustrated in the example of FIG. 15, in a case where the first resistor element ERa is coupled to the controller 80 when the temperature is 25° C., the output value of the digital signal is 512. Therefore, when the output value is 512, the CPU 84 determines the temperature to be 25° C. in the processing at step S23. Although not illustrated in the drawing, an output value that is obtained by coupling of the first resistor element ERa to the controller 80 when the temperature is not 25° C. and an output value that is obtained by coupling of the first resistor element ERa to the controller 80 when the temperature is 25° C., are different from each other in the temperature range of 0° C. to 50° C.

When the output of the first temperature sensor 40 has not been acquired in the processing at step S11 (No at step S21) or when it is determined that the output value indicated by the output signal converted into the digital signal in the processing at step S14 is not in the preferable characteristic range of the first temperature sensor 40 (No at step S22), the CPU 84 determines whether the output of the second temperature sensor 50 has been acquired in the processing at step S11 (step S24). When the output of the second temperature sensor 50 has been acquired (Yes at step S24), the CPU 84 determines whether the output value indicated by the output signal converted into the digital signal in the processing at step S14 is in the preferable characteristic range of the second temperature sensor 50 (step S25).

In the example illustrated in FIG. 14, the variation in the output voltage relative to the temperature variation of 1° C. when the first resistor element ERa is coupled to the controller 80 is 2 in the temperature range of 50° C. to 100° C. (second temperature range). On the other hand, the variation in the output voltage relative to the temperature variation of 1° C. when the second resistor element ERb is coupled to the controller 80 is 10 in the temperature range of 50° C. to 100° C. As described above, in the example illustrated in FIG. 14, the variation in the output voltage relative to the temperature variation of 1° C. in the temperature range of 50° C. to 100° C. is larger in the case where the second resistor element ERb is coupled to the controller 80 than in the case where the first resistor element ERa is coupled to the controller 80. This is because, in the range of equal to or higher than 50° C., the increase degree of the volume resistivity of the second resistor element ERb relative to the temperature increase of the second resistor element ERb is higher than the increase degree of the volume resistivity of the first resistor element ERa relative to the temperature increase of the first resistor element ERa, as illustrated in the example of FIG. 9. In other words, the second resistor element ERb has higher sensitivity than that of the first resistor element ERa in the temperature range of 50° C. to 100° C.

In the example described with reference to FIG. 14, temperature determination accuracy based on the output value can be further enhanced in the case where the second resistor element ERb is coupled to the controller 80 rather than the case where the first resistor element ERa is coupled to the controller 80 in the temperature range of 50° C. to 100° C. Therefore, when the output of the second temperature sensor 50 has been acquired in the processing at step S24 (Yes at step S24), that is, when the output signal has been acquired in the state where the second resistor element ERb is coupled to the controller 80 and an output value expected to be obtained in the case where the second resistor element ERb is coupled to the controller 80 in the temperature range of 50° C. to 100° C. has been acquired, the CPU 84 determines that the output value indicated by the output signal converted into the digital signal in the processing at step S14 is in the preferable characteristic range of the second temperature sensor 50 (Yes at step S25).

When the output value indicated by the output signal converted into the digital signal in the processing at step S14 is determined to be in the preferable characteristic range of the second temperature sensor 50 (Yes at step S25), the CPU 84 determines the temperature of the temperature detection device 10 based on the output value of the second temperature sensor 50 (step S26). After the processing at step S23 or the processing at step S26, the measurement method determination processing (step S15) illustrated in FIG. 12 is terminated.

As illustrated in the example of FIG. 15, in a case where the second resistor element ERb is coupled to the controller 80 when the temperature is 75° C., the output value of the digital signal is 572. Therefore, when the output value is 572, the CPU 84 determines the temperature to be 75° C. in the processing at step S26. Although not illustrated in the drawing, an output value that is obtained by coupling of the second resistor element ERb to the controller 80 at a temperature other than 75° C. and the output value that is obtained by coupling of the second resistor element ERb to the controller 80 when the temperature is 75° C. are different from each other in the temperature range of 50° C. to 100° C.

In the example of FIG. 15, in a case where the first resistor element ERa is coupled to the controller 80 when the temperature is 75° C., the output value of the digital signal is 512. The output value of the digital signal that is obtained by coupling of the first resistor element ERa to the controller 80 may be 512 even when the temperature is not 75° C. in the temperature range of 50° C. to 100° C. As a reason for this, the temperature of the temperature detection device 10 can be determined from the output value that is obtained by coupling of the second resistor element ERb to the controller 80 in the temperature range of 50° C. to 100° C. in the first embodiment. In the example of FIG. 15, in a case where the second resistor element ERb is coupled to the controller 80 when the temperature is 25° C., the output value of the digital signal is 452. The output value of the digital signal that is obtained by coupling of the second resistor element ERb to the controller 80 may be 452 even when the temperature is not 25° C. in the temperature range of 0° C. to 50° C. As a reason for this, the temperature of the temperature detection device 10 can be determined from the output value that is obtained by coupling of the first resistor element ERa to the controller 80 in the temperature range of 0° C. to 50° C. in the first embodiment.

Data indicating a range of the output values included in the preferable characteristic range among output values expected to be obtained when the first resistor element ERa is coupled to the controller 80 and data indicating a range of the output values included in the preferable characteristic range among output values expected to be obtained when the second resistor element ERb is coupled to the controller 80, are included in the computer program or the like stored in the ROM 86 or EEPROM 87.

The processing related to the temperature measurement described with reference to FIG. 12 is performed individually after step S4 and step S7 that are executed in accordance with switching of coupling to the first temperature sensor 40 and the second temperature sensor 50, which function as triggers for the measurement. Thus, by performing both of the processing based on the output value when the first resistor element ERa is coupled to the controller 80 and the processing based on the output value when the second resistor element ERb is coupled to the controller 80, the temperature of the temperature detection device 10 can be detected utilizing both of the preferable characteristic range of the first temperature sensor 40 and the preferable characteristic range of the second temperature sensor 50.

A relation between switching timing of coupling by the multiplexer MP and periodic switching timing of coupling to the first temperature sensor 40 or the second temperature sensor 50, which has been described with reference to FIG. 11, is desirably set. For example, the multiplexer MP may perform a switching operation in a state where the first temperature sensor 40 and the controller 80 are coupled by the switches SW1 and the switch SW2 to proceed with switching of coupling to the first resistor element ERa in each of the partial temperature detection regions PA included in the detection part SA of the first temperature sensor 40. In this case, after the coupling target to the controller 80 is switched from the first temperature sensor 40 to the second temperature sensor 50 by the switches SW1 and the switch SW2, the multiplexer MP performs the switching operation again to proceed with switching of coupling to the second resistor element ERb in each of the partial temperature detection regions PA included in the detection part SA of the second temperature sensor 50. The periodic switching of coupling to the first temperature sensor 40 or the second temperature sensor 50, which has been described with reference to FIG. 11, may be performed in a state where the multiplexer MP is coupled to one switch SW1. In this case, the multiplexer MP switches the switch SW1 as the coupling target in order every time one cycle from the processing at step S1 to the processing at step S7 in FIG. 11 is completed. The temperature detection device 10 can thereby individually determine the temperatures at positions of the respective partial temperature detection regions PA included in the detection part SA.

The temperature detection device 10 and the display panel 2 overlap with each other in the third direction Dz such that the detection part SA cover the display region AA (refer to FIG. 18 and the like) of the image by the display panel 2, whereby the temperature detection device 10 can detect temperature variation that is possibly caused by light guided by the optical system RM and condensed toward the display region AA of the display panel 2. Operation control of the display panel 2 can thereby be performed depending on the temperature variation. When the temperature detection device 10 detects such high temperature that the display output quality of the display panel 2 cannot be ensured, the operation of the display panel 2 may be stopped. In such a case, display output of an image by the display panel 2 may be stopped only in an area corresponding to a part (partial temperature detection region PA) of the temperature detection device 10 at which the high temperature has been detected. The CPU 84 may perform the above-mentioned operation control of the display panel 2. In this case, for example, the CPU 84 and the display panel 2 are coupled to each other through the GPIO 89 or the communication IF 90, and the display panel 2 is provided so as to be able to receive the operation control by the CPU 84. An operation control device that is different from the controller 80 may perform the above-mentioned operation control of the display panel 2. In such a case, the operation control device is coupled to the controller 80 through the GPIO 89 or the communication IF 90 and is provided so as to be able to acquire information indicating the temperature of the temperature detection device 10 determined by the CPU 84.

As described above, according to the first embodiment, the temperature detection device 10 includes the detection part SA in which the first resistor elements ERa and the second resistor elements ERb having different relations between the variation in temperature and the variation in the electric resistance value are provided, the switches SW1 and SW2 provided capable of performing a switching operation so as to be coupled to one of a first circuit including the wiring to which the first resistor element ERa is coupled and a second circuit including the wiring to which the second resistor element ERb is coupled, the power supply circuit 91 configured to apply a voltage to the wiring to which the above-mentioned one circuit is coupled to generate the electric signal, and the controller 80 configured to detect the temperature of the detection part SA based on the strength of the electric signal. The controller 80 periodically operates the switches SW1 and SW2 so as to be able to acquire both of the electric signal generated in the first circuit and the electric signal generated in the second circuit.

The temperature can thereby be detected with high accuracy in both of a temperature range in which the first resistor elements ERa cause larger variation in the volume resistivity in accordance with the variation in temperature and a temperature range in which the second resistor elements ERb cause larger variation in the volume resistivity in accordance with the variation in temperature. Consequently, the temperature can be detected in a wider temperature range with high accuracy in comparison with the case where only one type of resistor elements is employed.

The first resistor elements ERa and the second resistor elements ERb overlap with each other in the emission direction (third direction Dz) of external light (for example, the sunlight LL) emitted to the detection part SA. Thus, the temperature variation caused by the light tends to occur in both of the first resistor elements ERa and the second resistor elements ERb. Consequently, the temperature at the position (for example, one partial temperature detection region PA) at which the first resistor element ERa and the second resistor element ERb is provided can be detected with higher accuracy.

The detection part SA includes the first temperature sensor 40 in which the first resistor elements ERa are arranged and the second temperature sensor 50 that is stacked with the first temperature sensor 40 and in which the second resistor elements ERb are arranged. The temperatures can thereby be detected with higher accuracy in a wider temperature range based on both of the electric signals generated in the first circuit and the electric signals generated in the second circuit at a plurality of places where the first resistor elements ERa and the second resistor elements ERb are arranged.

The temperature range in which the variation in the electric signal that enables detection of the temperature variation of equal to or lower than 1° C. is generated is different between the first circuit and the second circuit. The temperature can thereby be detected with high accuracy in a wider temperature range.

The controller 80 detects the temperature of the detection part SA based on the electric signal generated in the first circuit or the electric signal generated in the second circuit. The temperature can thereby be detected more rapidly in the temperature range in which the temperature can be determined by one of the electric signal generated in the first circuit and the electric signal generated in the second circuit.

The strength of the electric signal generated in the first circuit varies in accordance with the temperature of the first resistor element ERa, and the strength of the electric signal generated in the second circuit varies in accordance with the temperature of the second resistor element ERb. The temperature can thereby be detected with high accuracy in a wider temperature range based on the strength of the electric signal.

The HUD device 1 includes the display panel 2 configured to display an image and the temperature detection device 10. The temperature detection device 10 is arranged so as to overlap with the display panel 2. With this configuration, the temperature detection device 10 can detect the temperature variation when such variation in environmental conditions (for example, emission of the sunlight LL) occurs that causes the temperature variation in the display panel 2.

The detection part SA is arranged so as to overlap with the display region AA (refer to FIG. 18 and the like) in which an image is displayed on the display panel 2. With this configuration, the temperature detection device 10 can detect the temperature variation when such variation in the environmental conditions (for example, emission of the sunlight LL) occurs that causes the temperature variation in AA.

The measurement method determination processing (step S15) illustrated in FIG. 12 is not limited to that described with reference to FIG. 13. Hereinafter, a second embodiment that is different from the first embodiment in the flow of specific processing of the measurement method determination processing (step S15) will be described.

Unlike the example described with reference to FIG. 14 and FIG. 15 in the explanation of the first embodiment, there can be a temperature (boundary temperature) at which the temperature of the temperature detection device 10 cannot be accurately determined based on only one of the output value when the first resistor element ERa is coupled to the controller 80 and the output value when the second resistor element ERb is coupled to the controller 80, depending on the composition of the first resistor elements ERa and the composition of the second resistor elements ERb. To cope with this, in the second embodiment, the temperature of the temperature detection device 10 is determined based on both of an output value generated at the boundary temperature when the first resistor element ERa is coupled to the controller 80 and an output value generated at the boundary temperature when the second resistor element ERb is coupled to the controller 80.

Second Embodiment

Figure 16:
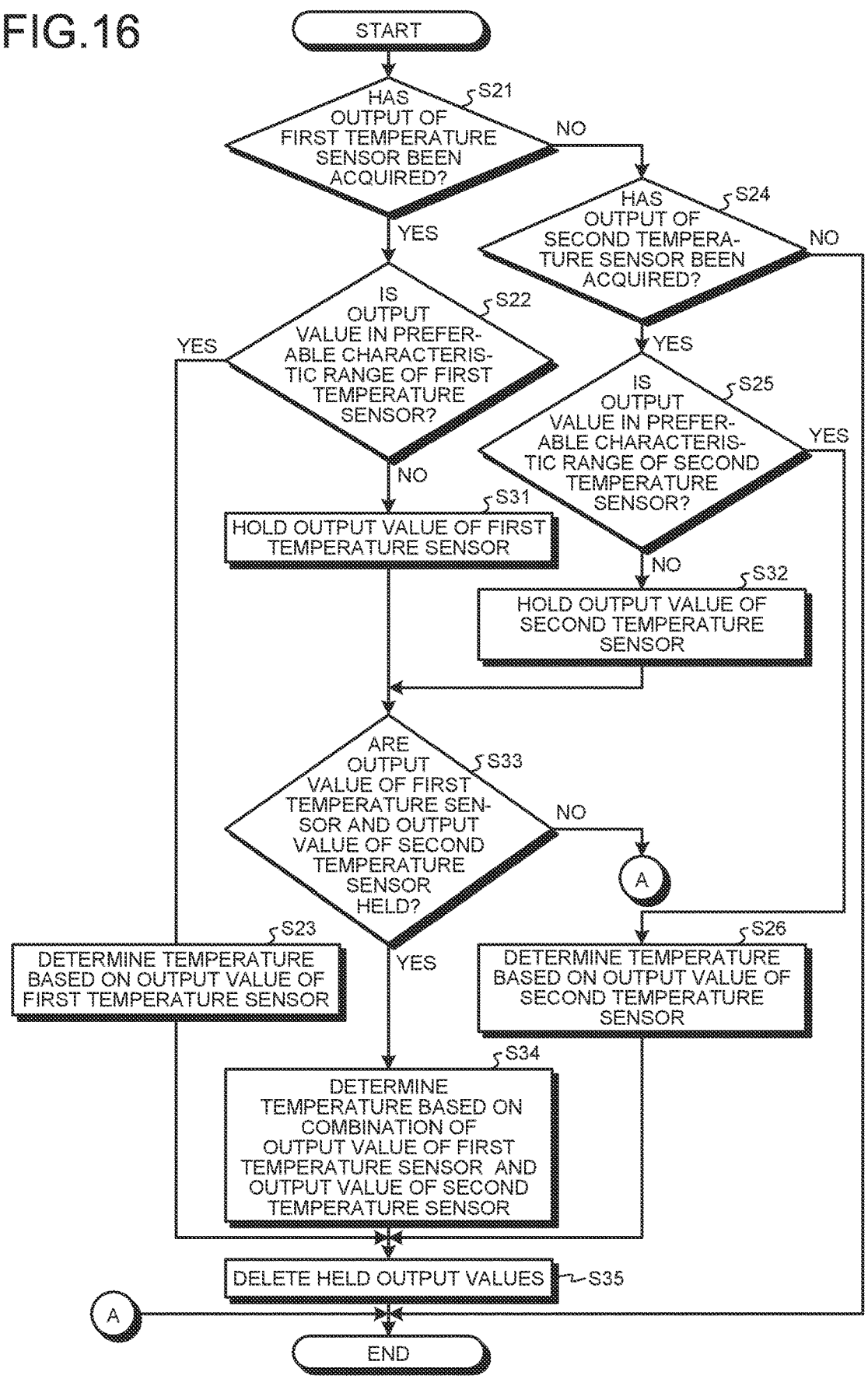
FIG. 16 is a flowchart illustrating another example of the flow of measurement method determination processing in a second embodiment.

FIG. 16 is a flowchart illustrating another example of the flow of the measurement method determination processing in the second embodiment. In explanation of the flowchart illustrated in FIG. 16, different parts from those in the explanation of the flowchart illustrated in FIG. 13 in the first embodiment are specially described.

In the second embodiment, as illustrated in FIG. 16, when it is determined that the output value is not in the preferable characteristic range of the first temperature sensor 40 at step S22 (No at step S22), the CPU 84 holds the output value as the output value of the first temperature sensor 40 (step S31). To be specific, the CPU 84 stores the output value as the output value of the first temperature sensor 40 in the RAM 88, for example.

In the second embodiment, when it is determined that the output value is not in the preferable characteristic range of the second temperature sensor 50 at step S25 (No at step S25), the CPU 84 holds the output value as the output value of the second temperature sensor 50 (step S32). To be specific, the CPU 84 stores the output value as the output value of the second temperature sensor 50 in the RAM 88, for example.

After the processing at step S31 or the processing at step S32, the CPU 84 determines whether both of the output value of the first temperature sensor 40 and the output value of the second temperature sensor 50 are held (step S33). When it is determined that at least one of the output value of the first temperature sensor 40 and the output value of the second temperature sensor 50 is not held (No at step S33), the CPU 84 temporarily terminates the measurement method determination processing. In this case, the CPU 84 comes into a state of waiting for restart of the processing related to the temperature measurement (refer to FIG. 12) that is performed in response to the switching of coupling to the first temperature sensor 40 or the second temperature sensor 50, which has been described with reference to FIG. 11, for determination of the temperature.

On the other hand, when it is determined that both of the output value of the first temperature sensor 40 and the output value of the second temperature sensor 50 are held at step S33 (Yes at step S33), the CPU 84 determines the temperature based on a combination of the output value of the first temperature sensor 40 and the output value of the second temperature sensor 50 (step S34). That is to say, in the processing at step S34, the CPU 84 determines the temperature based on both of the output value when the first resistor element ERa is coupled to the controller 80 and the output value when the second resistor element ERb is coupled to the controller 80. Hereinafter, the case where the processing at step S34 is performed will be described with reference to FIG. 17.

FIG. 17 is a table illustrating variation in an output voltage per 1° C. variation in temperature when the first resistor element ERa in the second embodiment is coupled to the controller 80 and variation in an output voltage per 1° C. variation in temperature when the second resistor element ERb in the second embodiment is coupled to the controller 80, in a range of 49° C. to 51° C. in steps of 1° C. It is assumed that the preferable characteristic range of the first temperature sensor 40 in the second embodiment is 0° C. to 49° C. It is further assumed that the preferable characteristic range of the second temperature sensor 50 in the second embodiment is 51° C. to 100° C.

As illustrated in FIG. 17, in a case where the first resistor element ERa is coupled to the controller 80 when the temperature is 49° C., the output value of the digital signal is 560. On the other hand, in a case where the first resistor element ERa is coupled to the controller 80 when the temperature is 50° C. or 51° C., the output value of the digital signal is 562. Thus, in the case of the processing based on the output value obtained when the first resistor element ERa is coupled to the controller 80, 49° C. and 50° C. can be distinguished from each other but 50° C. and 51° C. cannot be distinguished from each other. That is, in this example, the first temperature range is defined as a range equal to or greater than 0° C. and less than 50° C.

As illustrated in FIG. 17, in a case where the second resistor element ERb is coupled to the controller 80 when the temperature is 49° C. or 50° C., the output value of the digital signal is 462. On the other hand, in a case where the second resistor element ERb is coupled to the controller 80 when the temperature is 51° C., the output value of the digital signal is 464. Thus, in the case of the processing based on the output value when the second resistor element ERb is coupled to the controller 80, 50° C. and 51° C. can be distinguished from each other but 49° C. and 50° C. cannot be distinguished from each other. That is, in this example, the second temperature range is defined as a range greater than 50° C. and less than or equal to 100° C.

In the case of the example illustrated in FIG. 17, when both of the temperatures of the first resistor element ERa and the second resistor element ERb are 50° C., whether the temperature is 50° C. or 51° C. cannot be determined based on only the output value (562) obtained by coupling of the first resistor element ERa to the controller 80. In this case, whether the temperature is 49° C. or 50° C. cannot be determined based on only the output value (462) obtained by coupling of the second resistor element ERb to the controller 80. On the other hand, a combination of the output value (562) obtained by coupling of the first resistor element ERa to the controller 80 and the output value (462) obtained by coupling of the second resistor element ERb to the controller 80, is obtained when both of the temperatures of the first resistor element ERa and the second resistor element ERb are 50° C.; however the combination thereof is not obtained when the temperatures are 49° C. or 51° C. Thus, the CPU 84 can determine that both of the temperatures of the first resistor element ERa and the second resistor element ERb are 50° C. based on the combination of the output value (562) that is obtained by coupling of the first resistor element ERa to the controller 80 and the output value (462) that is obtained by coupling of the second resistor element ERb to the controller 80. In this manner, the CPU 84 determines the temperatures of the first resistor element ERa and the second resistor element ERb in the processing at step S34 and sets the determined temperature as the temperature of the temperature detection device 10. In the example illustrated in FIG. 17, 50° C. corresponds to the boundary temperature (third temperature range).

In the second embodiment, when the output value is held in at least one of the processing at step S31 and the processing at step S32, the output value is deleted (step S35) after the processing at step S23, after the processing at step S26, or after the processing at step S34. This can prevent the old output value that has been used for determination of the temperature from being continuously stored in the RAM 88 after the processing at step S34 and being unintentionally reused in subsequent processing. Completion of the processing at step S23 indicates that the temperature of the temperature detection device 10 can have been determined based on the output value in the preferable characteristic range of the first temperature sensor 40. That is to say, even when the processing at step S32 has been performed in advance and the output value of the second temperature sensor 50 is held, the output value is not necessary for the determination of the temperature. Therefore, the output value is deleted after the processing at step S23. Completion of the processing at step S26 indicates that the temperature of the temperature detection device 10 can have been determined based on the output value in the preferable characteristic range of the second temperature sensor 50. That is to say, even when the processing at step S31 has been performed in advance and the output value of the first temperature sensor 40 is held, the output value is not necessary for the determination of the temperature. Therefore, the output value is deleted after the processing at step S26.

The second embodiment is similar to the first embodiment except for the above-mentioned specially mentioned matters. According to the second embodiment, the controller 80 detects the temperature in a temperature range (for example, the boundary temperature) not overlapping with the temperature range in which the variation in the electric signal that enables detection of the temperature variation of equal to or lower than 1° C. occurs in the first circuit and a temperature range in which the variation in the electric signal that enables detection of the temperature variation of equal to or lower than 1° C. occurs in the second circuit, based on both of the electric signal generated in the first circuit and the electric signal generated in the second circuit. The temperature can thereby be detected with high accuracy in a wider temperature range.

Modifications

Next, various modifications that can be applied to the first embodiment and the second embodiment will be described with reference to FIG. 18 to FIG. 22.

First Modification

FIG. 18 is a schematic view illustrating an example of the configuration of a detection part SA in a first modification in a plan view. The partial temperature detection regions PA may be arranged outside the display region AA. For example, as illustrated in FIG. 18, four partial temperature detection regions PA may be arranged so as to abut against the display region AA outside the four sides of the display region AA having a rectangular shape. In this case, the detection part SA covers an area corresponding to a frame region of the display region AA. The size of the substrate 20 in the first modification is such a size that it can cover the area corresponding to the frame region of the display region AA. An area overlapping with the display region AA when viewed in the third direction Dz in the temperature detection device 10 is provided with only the substrate 20 or a hollow. Thus, the detection part SA is arranged in the area corresponding to the frame region of the display region AA, whereby the temperature detection device 10 can preferably transmit light for displaying an image that is output from the display region AA.

In the first modification described with reference to FIG. 18, the first temperature sensor 40 and the second temperature sensor 50 have the detection part SA in common as is the case with the first embodiment and the second embodiment. That is to say, the first temperature sensor 40 provided with the first resistor elements ERa and the second temperature sensor 50 provided with the second resistor elements ERb are stacked on each other in each of the partial temperature detection regions PA illustrated in FIG. 18.

Second Modification

Figure 19:
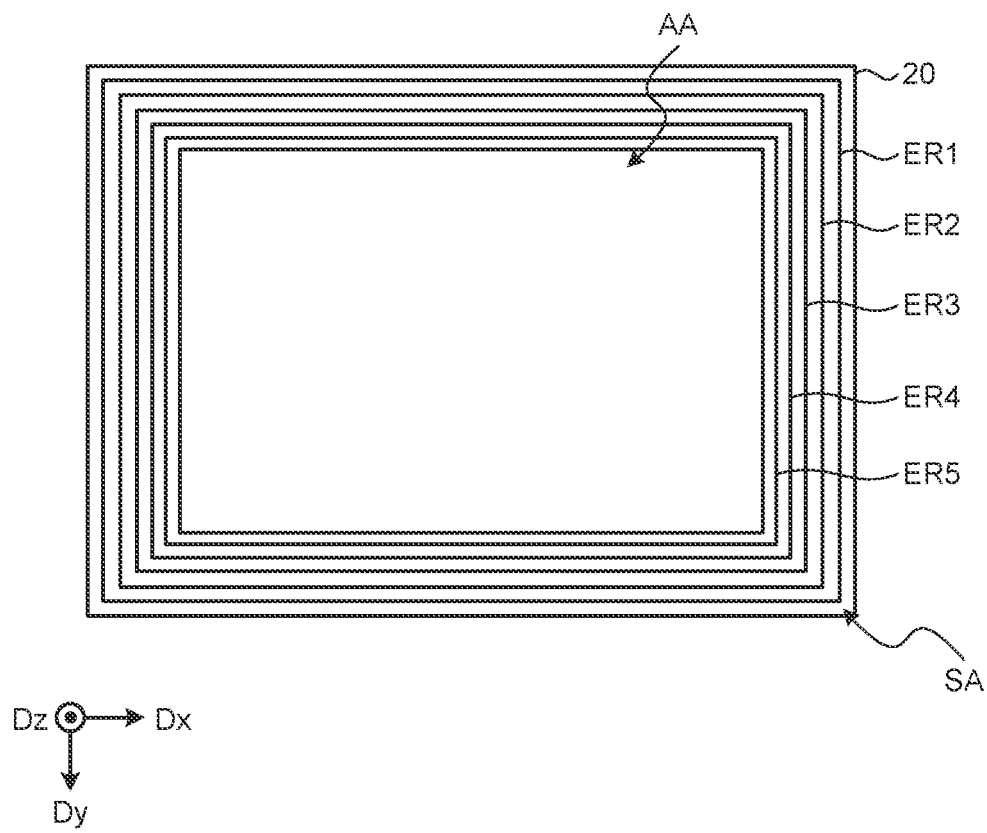
FIG. 19 is a schematic view illustrating an example of the configuration of a detection part in a second modification in a plan view.

FIG. 19 is a schematic view illustrating an example of the configuration of the detection part SA in a second modification in a plan view. As indicated by a positional relation and shapes of a first resistor element ER1, a second resistor element ER2, a third resistor element ER3, a fourth resistor element ER4, and a fifth resistor element ER5 in FIG. 19, a plurality of resistor elements having shapes framing the four sides of the display region AA may be provided in a non-contact manner in the detection part SA covering an area corresponding to a frame region of the display region AA. The first resistor element ER1, the second resistor element ER2, the third resistor element ER3, the fourth resistor element ER4, and the fifth resistor element ER5 illustrated in FIG. 19 are resistor elements having different compositions. The temperature can thereby be detected with higher accuracy based on output values in preferable characteristic ranges that are respectively exhibited by the first resistor element ER1, the second resistor element ER2, the third resistor element ER3, the fourth resistor element ER4, and the fifth resistor element ER5.

When three or more types of resistor elements ER are provided as in the second modification, a process of coupling one type resistor element among the three or more types of resistor elements ER to the controller 80 in the switching operation described with reference to FIG. 11 and acquiring an output signal in accordance with application of a voltage to a circuit including the coupled one type resistor element, is performed sequentially for each of the three or more types of resistor elements ER.

The first resistor element ER1, the second resistor element ER2, the third resistor element ER3, the fourth resistor element ER4, and the fifth resistor element ER5 may be provided in different layers. In this case, a layer in which the first resistor element ER1 is provided, a layer in which the second resistor element ER2 is provided, a layer in which the third resistor element ER3 is provided, a layer in which the fourth resistor element ER4 is provided, and a layer in which the fifth resistor element ER5 is provided are stacked on each other like the stacking relation between the first temperature sensor 40 and the second temperature sensor 50. The first resistor element ER1, the second resistor element ER2, the third resistor element ER3, the fourth resistor element ER4, and the fifth resistor element ER5 may be provided in the same layer. With this configuration, increase in the thickness of the temperature detection device 10 due to increase in the number of stacked layers can be prevented.

Third Modification

Figure 20:
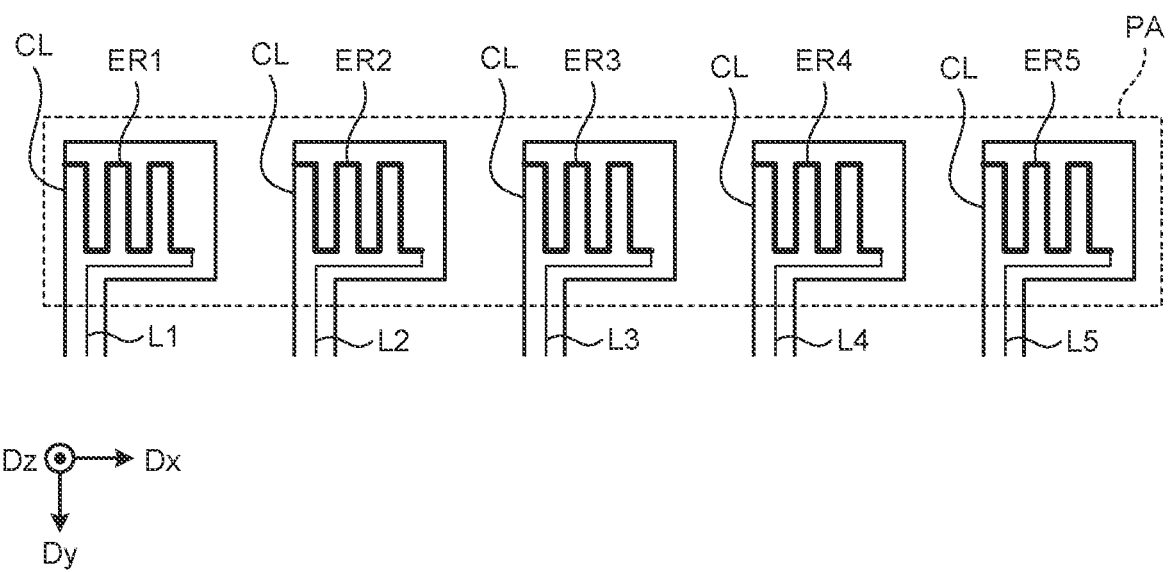
FIG. 20 is a schematic view illustrating an example of shapes and an arrangement of a first resistor element, a second resistor element, a third resistor element, a fourth resistor element, and a fifth resistor element in one partial temperature detection region in a third modification in a plan view.

FIG. 20 is a schematic view illustrating an example of shapes and an arrangement of the first resistor element ER1, the second resistor element ER2, the third resistor element ER3, the fourth resistor element ER4, and the fifth resistor element ER5 in one partial temperature detection region PA in a third modification in a plan view. As illustrated in FIG. 20, the first resistor element ER1, the second resistor element ER2, the third resistor element ER3, the fourth resistor element ER4, and the fifth resistor element ER5 may be arranged in each partial temperature detection region PA. In this case, the first resistor element ER1, the second resistor element ER2, the third resistor element ER3, the fourth resistor element ER4, and the fifth resistor element ER5 are desirably formed in the same layer. With this configuration, increase in the thickness of the temperature detection device 10 due to increase in the number of stacked layers can be prevented.

In the example illustrated in FIG. 20, the first resistor element ER1, the second resistor element ER2, the third resistor element ER3, the fourth resistor element ER4, and the fifth resistor element ER5 are arranged in the first direction Dx. Alternatively, they may be arranged in the second direction Dy or another direction in a plan view. The third modification may be combined with the first modification.

Although the first resistor element ER1, the second resistor element ER2, the third resistor element ER3, the fourth resistor element ER4, and the fifth resistor element ER5 illustrated in FIG. 20 have shapes similar to the shapes (refer to FIG. 6) of the resistor elements ER in the first embodiment, the shapes of them are not limited thereto.

Fourth Modification

FIG. 21 is a schematic view illustrating an example of shapes and an arrangement of the first resistor element ER1, the second resistor element ER2, the third resistor element ER3, the fourth resistor element ER4, and the fifth resistor element ER5 in one partial temperature detection region PA in a fourth modification in a plan view. As illustrated in FIG. 21, it is sufficient that each of the first resistor element ER1, the second resistor element ER2, the third resistor element ER3, the fourth resistor element ER4, and the fifth resistor element ER5 has a connected shape one end of which is coupled to the reference potential line CL and the other end of which is coupled the individual wiring line L1, L2, L3, L4, or L5. The shape of a part other than the ends may be a rectangular shape as illustrated in FIG. 21 or may be another shape (not illustrated).

It is not essential that the detection part SA includes the partial temperature detection regions PA.

Fifth Modification

FIG. 22 is a schematic view illustrating an example of the configuration of the detection part SA in a fifth modification in a plan view. As illustrated in FIG. 22, one resistor element ER may be provided in the detection part SA. In this case, m is 1, and the number of switch SW1 is one. In FIG. 22, wiring coupled to the other end of the resistor element ER is wiring L1 because m is 1. In this case, the multiplexer MP is omitted. That is to say, in this case, the switch SW1 and the filter 81 are coupled with no multiplexer MP interposed therebetween.

The shape of one or more resistor elements ER in the first embodiment, the second embodiment, and the fifth modification may be similar to the shape of each of the first resistor element ER1, the second resistor element ER2, the third resistor element ER3, the fourth resistor element ER4, and the fifth resistor element ER5 illustrated in FIG. 21 or another shape (not illustrated).

The temperature detection device 10 may not be provided in the HUD device 1. For example, the temperature detection device 10 may be provided so as to overlap with a display device of another mode, the temperature detection device 10 may be combined with a device other than the display device, or the temperature detection device 10 may be provided alone.

The number of types of resistor elements included in the temperature detection device 10 may be three, or equal to or more than six. It is sufficient that a plurality of types of resistor elements are included in the temperature detection device 10.

When the detection part SA overlaps with the display region AA as viewed in the third direction Dz, the electrode included in each resistor element ER is desirably an electrode having a light-transmitting property or a micronized electrode having a negligibly low shielding factor of light that is output to the mirror member RM1 from the display region AA.

The specific configurations of the first circuit and the second circuit are not limited to the above-mentioned examples. For example, a voltage may be directly applied to the plurality of types of resistor elements and currents flowing through the resistor elements may be handled as output signals, and the temperature may be determined based on the strengths of the output signals.

Other action effects provided by the aspect described in the embodiments that are obvious from description of the present specification or at which those skilled in the art can appropriately arrive should be interpreted to be provided by the present disclosure.

What is claimed is:

1. A temperature detection device comprising:
   a detection part in which a first resistor element and a second resistor element having different relations between temperature variation and variation in an electric resistance value are provided;
   a switch provided capable of performing a switching operation so as to be coupled to one of a first circuit including wiring to which the first resistor element is coupled and a second circuit including wiring to which the second resistor element is coupled;
   a power supply circuit configured to apply a voltage to the one circuit coupled to the power supply circuit through the switch to generate an electric signal in the one circuit; and
   a controller configured to detect a temperature of the detection part based on a strength of the electric signal output from the one circuit, wherein
   the controller is configured to periodically cause the switch to perform the switching operation,
   variation in the electric signal occurs in the first circuit based on temperature variation of equal to or lower than 1° C. when a detection temperature range of the detection part is a first temperature range,
   variation in the electric signal occurs in the second circuit based on temperature variation of equal to or lower than 1° C. when the detection temperature range of the detection part is a second temperature range,
   the first temperature range does not overlap with the second temperature range, and
   the controller detects a temperature in a third temperature range not overlapping with the first temperature range and the second temperature range, based on both of the electric signal generated in the first circuit and the electric signal generated in the second circuit.

2. The temperature detection device according to claim 1, wherein the first resistor element and the second resistor element overlap with each other.

3. The temperature detection device according to claim 2, wherein the detection part includes:
   a first temperature sensor in which a plurality of the first resistor elements are arranged; and
   a second temperature sensor that is stacked with the first temperature sensor and in which a plurality of the second resistor elements are arranged.

4. The temperature detection device according to claim 1, wherein the detection part includes:
   a first temperature sensor in which a plurality of the first resistor elements are arranged; and
   a second temperature sensor that is stacked with the first temperature sensor and in which a plurality of the second resistor elements are arranged.

5. The temperature detection device according to claim 1, wherein the first resistor element and the second resistor element are formed in the same layer.

6. The temperature detection device according to claim 5, wherein the detection part includes:
   a first temperature sensor in which a plurality of the first resistor elements are arranged; and
   a second temperature sensor that is stacked with the first temperature sensor and in which a plurality of the second resistor elements are arranged.

7. The temperature detection device according to claim 1, wherein the controller detects the temperature of the detection part based on one of the electric signal generated in the first circuit and the electric signal generated in the second circuit.

8. The temperature detection device according to claim 1, wherein the third temperature range is between the first temperature range and the second temperature range.

9. The temperature detection device according to claim 1, wherein
   a strength of the electric signal generated in the first circuit varies in accordance with a temperature of the first resistor element, and
   a strength of the electric signal generated in the second circuit varies in accordance with a temperature of the second resistor element.

10. A display device comprising:
    a display panel configured to display an image; and
    the temperature detection device according to claim 1, wherein
    the temperature detection device is arranged so as to overlap with the display panel.

11. The display device according to claim 10, wherein the detection part overlaps with a display region in which the image is displayed on the display panel.

12. The display device according to claim 10, wherein, in a plan view, the detection part is arranged in a periphery of a display region in which the image is displayed on the display panel.

13. A head up display comprising:
a display panel configured to display an image; and
a temperature detection device arranged so as to overlap with a display surface of the display panel, wherein
the temperature detection device includes:
- a detection part in which a first resistor element and a second resistor element having different relations between temperature variation and variation in an electric resistance value are provided;
- a switch provided capable of performing a switching operation so as to be coupled to one of a first circuit including wiring to which the first resistor element is coupled and a second circuit including wiring to which the second resistor element is coupled;
- a power supply circuit configured to apply a voltage to the one circuit coupled to the power supply circuit through the switch to generate an electric signal in the one circuit; and
- a controller configured to detect a temperature of the detection part based on a strength of the electric signal output from the one circuit, and the controller is configured to periodically cause the switch to perform the switching operation,
variation in the electric signal occurs in the first circuit based on temperature variation of equal to or lower than 1° C. when a detection temperature range of the detection part is a first temperature range,
variation in the electric signal occurs in the second circuit based on temperature variation of equal to or lower than 1° C. when the detection temperature range of the detection part is a second temperature range,
the first temperature range does not overlap with the second temperature range, and
the controller detects a temperature in a third temperature range not overlapping with the first temperature range and the second temperature range, based on both of the electric signal generated in the first circuit and the electric signal generated in the second circuit.

14. The head up display according to claim 13, wherein the first resistor element and the second resistor element overlap with each other.

15. The head up display according to claim 13, wherein the detection part includes:
- a first temperature sensor in which a plurality of the first resistor elements are arranged; and
- a second temperature sensor that is stacked with the first temperature sensor and in which a plurality of the second resistor elements are arranged.

16. The head up display according to claim 13, wherein the first resistor element and the second resistor element are formed in the same layer.

17. The head up display according to claim 13, wherein the controller detects the temperature of the detection part based on one of the electric signal generated in the first circuit and the electric signal generated in the second circuit.

* * * * *